(12) United States Patent
Murakami et al.

(10) Patent No.: US 6,211,772 B1
(45) Date of Patent: Apr. 3, 2001

(54) SEMICONDUCTOR COMPOSITE SENSOR

(75) Inventors: Susumu Murakami, Hitachinaka; Satoshi Shimada, Hitachi; Seiichi Ugai; Yukio Takahashi, both of Hitachinaka; Shuichi Shimizu, Gunma-ken, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/417,235

(22) Filed: Sep. 5, 1997

Related U.S. Application Data

(63) Continuation of application No. 08/591,878, filed on Jan. 26, 1996, now abandoned.

(30) Foreign Application Priority Data

Jan. 30, 1995 (JP) .................................................. 7-012299

(51) Int. Cl.⁷ .................................................. H01L 10/10
(52) U.S. Cl. .................................. 338/42; 338/4; 338/36; 257/419; 73/721; 73/727
(58) Field of Search .................................. 338/4, 36, 42; 257/516, 536, 417, 419; 73/721, 727

(56) References Cited

U.S. PATENT DOCUMENTS

| | | | | |
|---|---|---|---|---|
| 3,265,905 | * | 8/1966 | McNeil | 257/536 |
| 3,430,110 | * | 2/1969 | Goshgarian | 257/536 |
| 3,457,123 | * | 7/1969 | Van Pul | 257/536 |
| 4,321,616 | * | 3/1982 | Bise | 257/516 |
| 4,977,101 | * | 12/1990 | Yoder et al. | 73/727 |
| 5,111,068 | * | 5/1992 | Kusakabe | 327/565 |
| 5,145,810 | * | 9/1992 | Matsumi | 437/901 |
| 5,200,733 | * | 4/1993 | Davis et al. | 338/64 |
| 5,231,301 | * | 7/1993 | Peterson et al. | 257/419 |
| 5,315,149 | * | 5/1994 | Compagne | 257/536 |
| 5,416,357 | * | 5/1995 | Kobayashi et al. | 257/536 |

FOREIGN PATENT DOCUMENTS

| | | |
|---|---|---|
| 35 43 261 | 6/1987 | (DE) . |
| 26 44 638 | 1/1988 | (DE) . |
| 0 146 709 | 7/1985 | (EP) . |
| 60-32993B | 7/1985 | (JP) . |
| 3-76139 U | 7/1991 | (JP) . |

OTHER PUBLICATIONS

"Miniature Piezoresistive Strain and Pressure Sensors with On–Chip Circuitry", by Sugiyama et al., Proceedings of the 3rd Sensor Symposium, 1983, pp. 209–213.

* cited by examiner

Primary Examiner—Karl D. Easthom
(74) Attorney, Agent, or Firm—Kenyon & Kenyon

(57) ABSTRACT

A semiconductor composite sensor using a plurality of semiconductor piezoresistive gauge elements connected in series. The piezoresistive elements are separated so that a high potential terminal of one of the resistive elements having the same resistance values and the substrate of the other of the resistive elements will be connected with equal potential values. Potential difference values between semiconductor regions serving as respective resistive elements and the substrates are made equal.

6 Claims, 19 Drawing Sheets

SEMICONDUCTOR COMPOSITE SENSOR

This application is a continuation of U.S. Ser. No. 08/591,878, Jan. 26, 1996, now abandoned.

BACKGROUND OF THE INVENTION

The present invention relates to sensors for detecting the flow rate or pressure in chemical plants, iron mills and power plants, and in particular to highly reliable semiconductor composite sensors which continue to have high accuracy even if they are used for a long period of time.

As pressure sensors using the piezoresistance effect of silicon, various techniques have been proposed heretofore.

For example, two piezoresistive elements formed in the same n-type semiconductor region subjected to p-n separation are known as described in "Miniature Piezoresistive Strain and Pressure Sensors with On-Chip Circuitry," by Susumu Sugiyama et al., PROCEEDINGS OF THE 3RD SENSOR SYMPOSIUM (1983).

As another example of a conventional technique, a similar structure is disclosed in JP-A-3-76139 (UM) as well. Furthermore, a semiconductor pressure sensor based upon the piezoresistance effect is disclosed in JP-B-60-32993 as well, which corresponds to U.S. patent application Ser. No. 619,866 filed on Oct. 6, 1975.

SUMMARY OF THE INVENTION

In theses techniques, however, two piezoresistive elements are connected in series in an n-type substrate having the same potential. Therefore, the potential difference between the resistance region and the substrate differs from piezoresistive element to piezoresistive element. Due to the difference in influence of the potential of the substrate exerted upon the resistance region, it was difficult to realize the same resistance value.

An object of the present invention is to provide a semiconductor composite sensor capable of having high accuracy and high reliability.

In accordance with the present invention, a semiconductor composite sensor includes at least two piezoresistive elements connected together, the two piezoresistive elements being identical in shape, and semiconductor regions having respective individual potential values and respectively surrounding the two piezoresistive elements, potential difference values between the two piezoresistive elements and the semiconductor regions being respectively made constant.

In order to provide two semiconductor regions with respective indidividual potential values, the semiconductor regions are disposed so as not to cause electric interference between the semiconductor regions and the semiconductor regions are supplied respectively with voltages from different supply sources.

In forming a bridge circuit by using the above described piezoresistive elements, at least two piezoelectric elements connected in series are made identical in shape, and a semiconductor region surrounding one piezoresistive element located on the voltage supply source side is supplied with the voltage of the voltage supply source whereas a semiconductor region surrounding the other piezoresistive element is supplied with the voltage of the voltage supply source minus a voltage drop across the piezoresistive element located on the voltage supply source side.

When at least two identical piezoresistive elements are to be connected in series, they are disposed so as to be covered by electrodes located on the negative side of the piezoresistive elements or electrodes located on the positive side of the piezoresistive elements. If one piezoresistive element is covered by an electrode of negative side at this time, the other piezoresistive element is also covered by an electrode of negative side. The same holds true for the electrodes of positive sides as well.

According to the present invention, semiconductor regions surrounding two or more piezoresistive elements are provided for respective piezoresistive elements and semiconductor regions are disposed so as not to cause mutual electric interference. Therefore, each semiconductor region is able to have an individual potential. No matter what potential each piezoresistive element has, therefore, the reverse bias voltage between the piezoresistive element and the semiconductor region can be made equal by making the potential difference with respect to each semiconductor region surrounding each piezoresistive element constant. Therefore, the width of a depletion layer appearing between the piezoresistive element and the semiconductor region can be made identical. That is to say, the width of the depletion layer interferring with the piezoresistive element can also be made constant. Especially when the same resistive elements are used, therefore, a change of resistance caused by influence of the depletion layer can be made constant.

According to the present invention, an input or output terminal electrode of piezoresistive elements is disposed so as to cover each of two identical piezoresistive elements connected in series. Therefore, accumulation layers are formed between the electrodes and the piezoresistive elements. Voltage drop values across two piezoresistive elements and influence of electrodes exerted upon piezoresistive elements can be made constant. The width of the appearing accumulation layers can be made constant. With respect to the electric influence of the surface of the semiconductor layer, therefore, the electrodes serve as shields and changes of piezoresistive elements caused by influence of the accumulation layers can be made constant.

According to the present invention, when a bridge circuit is formed by uisng four piezoresistive elements, at least two piezoresistive elements connected in series in the bridge circuit are made identical. Potential difference values with respect to semiconductor regions respectively surrounding two piezoresistive elements are made equal by applying a voltage equal to a voltage applied to a piezoresistive element located on an electrically positive side to a semiconductor region surrounding the piezoresistive element of the positive side and included in two semiconductor regions and applying the voltage applied to the positive side minus a voltage drop across the piezoresistive element of positive side to a semiconductor region surrounding a piezoresistive element of negative side.

Thus, a semiconductor composite sensor having not only high accuracy but also high reliability and a reduced output drift is obtained. Furthermore, in forming a bridge, all piezoresistive elements, semiconductor regions surrounding the piezoresistive elements, and electrodes disposed on the piezoresistive elements are made identical and subjected to the same voltage condition. By doing so, all resistance values can be made equal under any condition and environment of use. Therefore, an output correction circuit becomes unnecessary, and a highly accurate, highly reliable semiconductor composite sensor is obtained.

DESCRIPTION OF THE PREFERRED EMBODIMENTS

Hereafter, embodiments of the present invention will be described by referring to drawing. Throughout all Figures, like components are denoted by like numerals.

Figure 1:
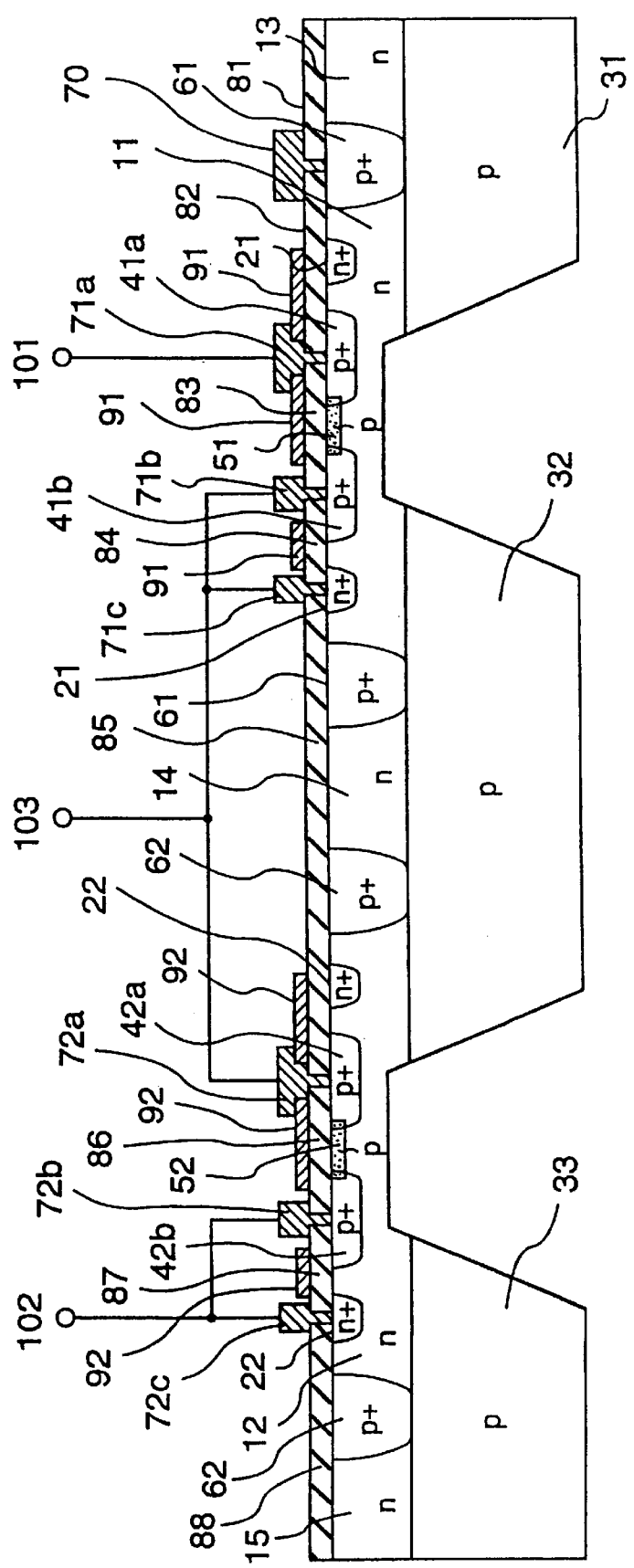
FIG. 1 is a sectional view showing a first embodiment of the present invention.

FIG. 1 is a schematic sectional view showing a first embodiment of a semiconductor composite sensor according to the present invention. In FIG. 1, numerals 11 through 15 denote n-type semiconductor regions formed on p-type semiconductor regions 31 through 33. Numerals 51 and 52 denote p-type semiconductor regions functioning as piezoresistive elements. Adjacent to ends of the piezoresistive element 51, $p^+$-type semiconductor regions 41a and 41b each having a high impurity concentration are formed. Adjacent to ends of the piezoresistive element 52, $p^+$-type semiconductor regions 42a and 42b each having a high impurity concentration are formed. An $n^+$-type semiconductor region 21 having a high impurity concentration is formed so as to surround the outside of the p-type semiconductor region 51 and the $p^+$-type semiconductor regions 41a and 41b via the n-type semiconductor region 11. An n-type semiconductor region 22 having a high impurity concentration is formed so as to surround the outside of the p-type semiconductor region 52 and the $p^+$-type semiconductor regions 42a and 42b via the n-type semiconductor region 12. Furthermore, a $p^+$-type semiconductor region 61 having a high impurity concentration and featuring the present invention is formed so as to surround the outside of the $n^+$-type semiconductor region 21 via the n-type semiconductor region 11 and so as to be linked with p-type semiconductor regions 31 and 32. A $p^+$-type semiconductor region 62 having a high impurity concentration is formed so as to surround the outside of the $n^+$-type semiconductor region 22 via the n-type semiconductor region 12 and so as to be linked with the p-type semiconductor region 32 and a p-type semiconductor region 33. Numerals 81 through 88 denote insulating films each including silicon dioxide or a composite film of silicon dioxide and phosphorus glass formed on the surface of the semiconductor. Openings are provided for these insulating films. On the $p^+$-type semiconductor regions 41a and 41b each having a high impurity concentration, electrodes 71a and 71b are formed respectively so as to be in ohmic contact with the regions 41a and 41b, respectively. On the $n^+$-type semiconductor region 21, an electrode 71c is formed so as to be in ohmic contact with it. On the $p^+$-type semiconductor regions 42a and 42b each having a high impurity concentration, electrodes 72a and 72b are formed respectively so as to be in ohmic contact with the regions 42a and 42b, respectively. On the $n^+$-type semiconductor region 22, an electrode 72c is formed so as to be in ohmic contact with it. Furthermore, on the $p^+$-type semiconductor region 61, an electrode 70 is formed so as to be in ohmic contact with it. Numeral 91 denotes an electric conductor. The electric conductor 91 strides over a p-n junction formed by the $p^+$-type semiconductor regions 41a and 41b each having a high impurity concentration and the n-type semiconductor region 11. The electric conductor 91 also strides over an $n^+$-n junction formed by the $n^+$-type semiconductor region 21 having a high impurity concentration and the n-type semiconductor region 11. The electric conductor 91 covers the surface of the n-type semiconductor region 11 sandwiched between the $p^+$-type semiconductor region 41a or 41b and the $n^+$-type semiconductor region 21 having a high impurity concentration and covers the surface of the p-type semiconductor region 51. Furthermore, the electric conductor 91 is electrically connected to the electrode 71a. Numeral 92 denotes an electric conductor. The electric conductor 92 strides over a p-n junction formed by the $p^+$-type semiconductor regions 42a and 42b each having a high impurity concentration and the n-type semiconductor region 12. The electric conductor 92 also strides over an $n^+$-n junction formed by the $n^+$-type semiconductor region 22 having a high impurity concentration and the n-type semiconductor region 12. The electric conductor 92 covers the surface of the n-type semiconductor region 12 sandwiched between the p+-type semiconductor region 42a or 42b and the n+-type semiconductor region 22 having a high impurity concentration and covers the surface of the p-type semiconductor region 52. Furthermore, the electric conductor 92 is electrically connected to the electrode 72a. Furthermore, an electrode terminal 101 is taken out from the electrode 71a. The electrodes 71b, 71c and 72a are electrically connected together, and an electrode terminal 103 is taken out from them. The electrodes 72b and 72c are electrically connected together, and an electrode terminal 102 is taken out from them. Thus, the p-type semiconductor regions 51 and 52 functioning as piezoresistive elements are connected in series between the electrode terminals 101 and 102. If the p-type semiconductor regions 51 and 52 have equal resistance values, then the potential of the electrode terminal 103 can be kept at a potential equivalent to half of a voltage applied between the electrode terminal 101 and the electrode terminal 102.

Figure 2:
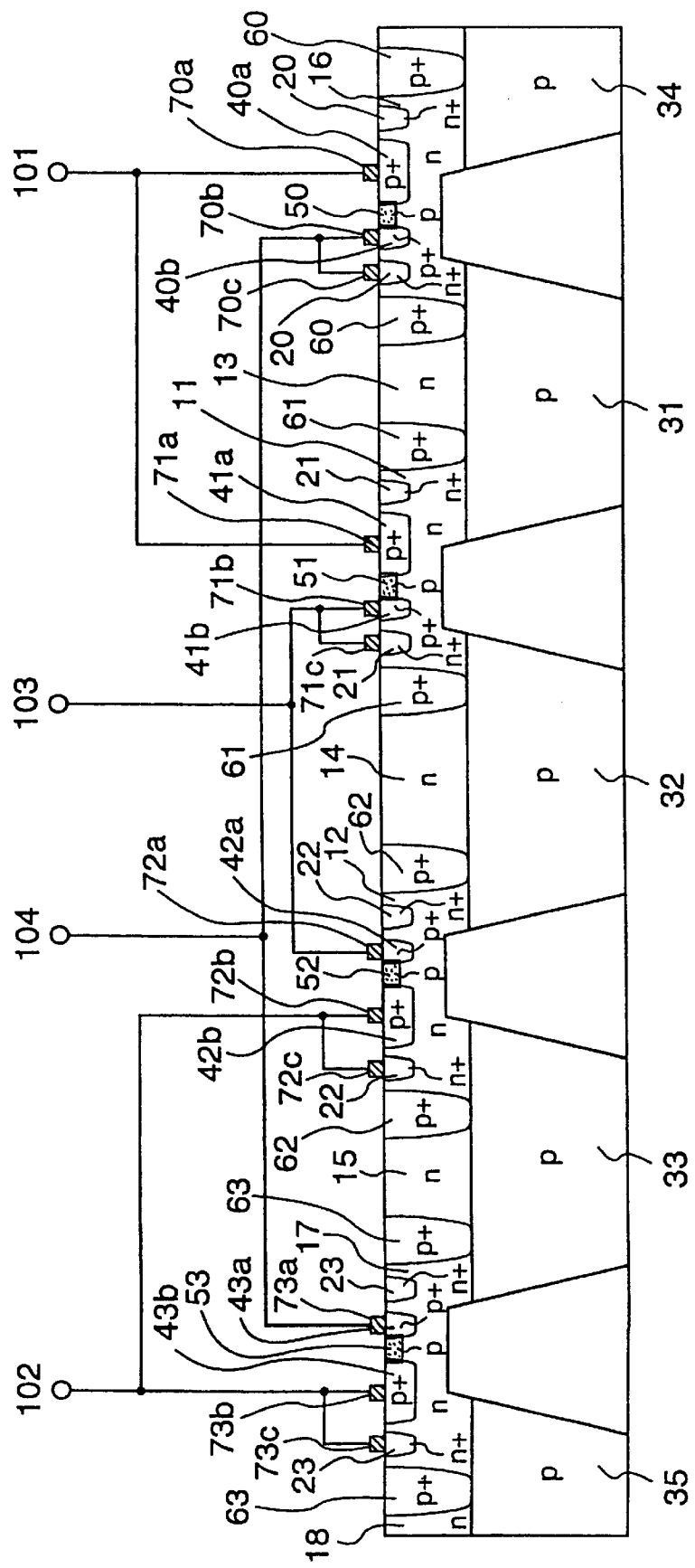
FIG. 2 is a sectional view showing an example of application of the first embodiment of the present invention.

FIG. 2 is a schematic sectional view showing an application example of the second embodiment of a semiconductor composite sensor including a resistance bridge of the present invention. In FIG. 2, numerals 11 through 18 denote n-type semiconductor regions, which are formed on p-type semiconductor regions 31 through 35. Numerals 50 through 53 denote p-type semiconductor regions functioning as piezoresistive elements. Adjacent to ends of the piezoresistive element 50, p+-type semiconductor regions 40a and 40b each having a high impurity concentration are formed. Adjacent to ends of the piezoresistive element 51, p+-type semiconductor regions 41a and 41b each having a high impurity concentration are formed. Adjacent to ends of the piezoresistive element 52, p+-type semiconductor regions 42a and 42b each having a high impurity concentration are formed. Adjacent to ends of the piezoresistive element 53, p+-type semiconductor regions 43a and 43b each having a high impurity concentration are formed. An n+-type semiconductor region 20 having a high impurity concentration is formed so as to surround the outside of the p-type semiconductor region 50 and the p+-type semiconductor regions 40a and 40b via the n-type semiconductor region 16. An n+-type semiconductor region 21 having a high impurity concentration is formed so as to surround the outside of the p-type semiconductor region 51 and the p+-type semiconductor regions 41a and 41b via the n-type semiconductor region 11. An n+-type semiconductor region 22 having a high impurity concentration is formed so as to surround the outside of the p-type semiconductor region 52 and the p+-type semiconductor regions 42a and 42b via the n-type semiconductor region 12. An n+-type semiconductor region 23 having a high impurity concentration is formed so as to surround the outside of the p-type semiconductor region 53 and the p+-type semiconductor regions 43a and 43b via the n-type semiconductor region 17. Furthermore, a p+-type semiconductor region 60 having a high impurity concentration and featuring the present invention is formed so as to surround the outside of the n+-type semiconductor region 20 via the n-type semiconductor region 16 and so as to be linked with p-type semiconductor regions 31 and 34. A p+-type semiconductor region 61 having a high impurity concentration is formed so as to surround the outside of the n+-type semiconductor region 21 via the n-type semiconductor region 11 and so as to be linked with p-type semiconductor regions 31 and 32. A p+-type semiconductor region 62 having a high impurity concentration is formed so as to surround the outside of the n+-type semiconductor region 22 via the n-type semiconductor region 12 and so as to be linked with the p-type semiconductor regions 32 and 33. A p+-type semiconductor region 63 having a high impurity concentration is formed so as to surround the outside of the n+-type semiconductor region 23 via the n-type semiconductor region 17 and so as to be linked with the p-type semiconductor regions 33 and 35. For brevity of description, insulating films formed on the semiconductor surface and described with reference to FIG. 1 are omitted in FIG. 2.

In FIG. 2, electrodes 70a, 70b and 70c; 71a, 71b and 71c; 72a, 72b and 72c; and 73a, 73b and 73c are formed on respective semiconductor regions of high impurity concentrations, namely, p+-type regions 40a and 40b and n+-type regions 20; p+-type regions 41a and 41b and n+-type region 21; p+-type regions 42a and 42b and n+-type region 22; and p+-type regions 43a and 43b and n+-type region 23 so as to be in ohmic contact therewith.

Via those electrodes, the p+-type semiconductor regions 40a and 41a are electrically connected together. An electrode terminal 101 is taken out from the p+-type semiconductor regions 40a and 41a thus connected together. The p+-type semiconductor region 40b, the n+-type semiconductor region 20, and the p+-type semiconductor region 43a are electrically connected together, and an electrode terminal 104 is taken out therefrom. The p+-type semiconductor region 41b, the n+-type semiconductor region 21, and the p+-type semiconductor region 42a are electrically connected together, and an electrode terminal 103 is taken out therefrom. The p+-type semiconductor region 42b, the n+-type semiconductor region 22, the p+-type semiconductor region 43b, and the n+-type semiconductor region 23 are electrically connected together, and an electrode terminal 102 is taken out therefrom.

The electrode terminals 101 through 104 heretofore described are used as terminals of the resistance bridge circuit.

Figure 3:
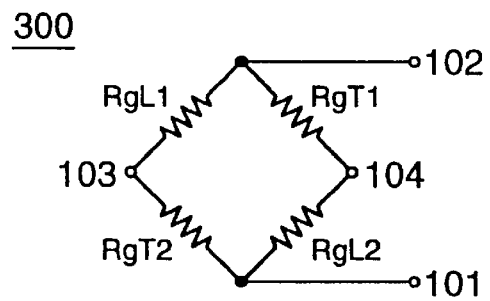
FIG. 3 is a circuit diagram showing an example of application of the first embodiment of the present invention.

FIG. 3 is a circuit diagram of a circuit 300 obtained when the piezoresistive elements according to the present invention shown in FIGS. 1 or 2 are used in a semiconductor composite sensor. In FIG. 3, RgL1, RgL2, RgT1 and RgT2 are piezoresistive elements of a differential pressure sensor. The p-type semiconductor region 52 shown in FIG. 2 functioning as a piezoresistive element is included in the RgL1. The p-type semiconductor region 53 is included in the RgT1. The p-type semiconductor region 50 is included in the RgL2. The p-type semiconductor region 51 is included in the RgT2.

The electrode terminal 101 is connected to the ground which functions as a reference potential. A positive voltage is applied to the electrode terminal 102. Under this state, a bridge output ΔEd proportionate to the differential pressure is obtained between the electrode terminals 103 and 104.

As a result of application of piezoresistive elements according to the present invention to such a circuit configuration, a semiconductor pressure sensor having high accuracy and high reliability can be obtained. Hereafter, operation of the semiconductor pressure sensor will be described by referring to drawing.

Figure 4:
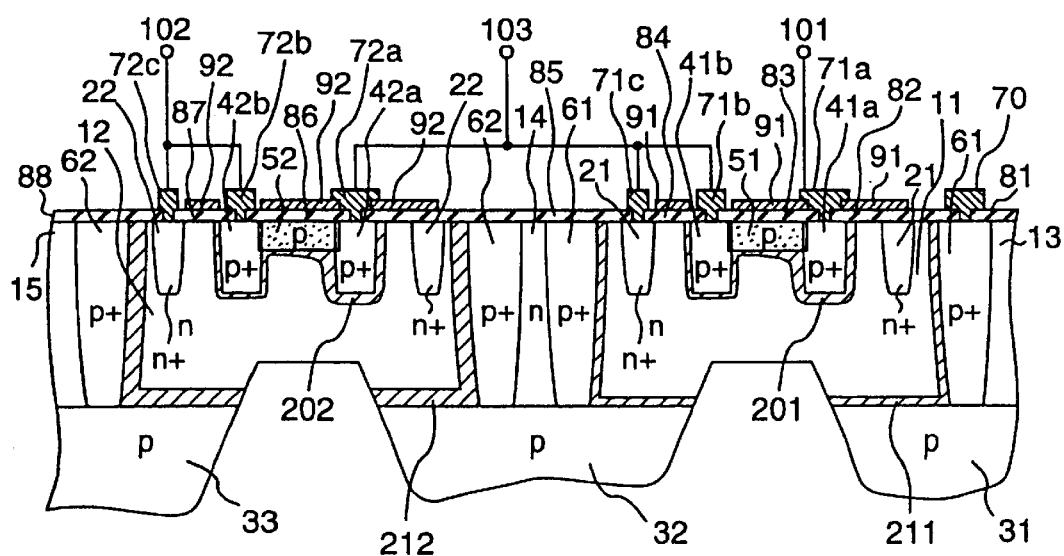
FIG. 4 is a diagram illustrating the operation of the first embodiment of the present invention.

FIG. 4 is a schematic sectional view obtained when a voltage is applied between ends of resistive elements connected in series as shown in FIG. 1 which is a basic configuration of the present invention. In the case where the electrode terminal 101 is provided with the ground potential and 3 V is applied to the electrode potential 102, the potential of the electrode terminal 103 becomes 1.5 V provided that the piezoresistive elements 51 and 52 have the same value. In this case, a depletion layer 201 spreads on both sides of a p-n junction formed between the n-type semiconductor region 11 and a p-type semiconductor including the p$^+$-type semiconductor regions 41a and 41b and the piezoresistive element 51. The depletion layer 201 has the same shape as a depletion layer 202 which spreads on both sides of a p-n junction formed between the n-type semiconductor region 12 and a p-type semiconductor including the p$^+$-type semiconductor regions 42a and 42b and the piezoresistive element 52. Basically, values of the piezoresistive elements 51 and 52 can be made equal to a predetermined value. On both sides of a p-n junction formed between the n-type semiconductor region 11 and each of the p$^+$-type semiconductor region 61 and the p-type semiconductor regions 31 and 32, a depletion layer 211 produced by a reverse bias voltage of 1.5 V spreads. As for the piezoresistive element shown on the left part of FIG. 4, the potential of the n-type semiconductor region 12 is 3 V. Therefore, a depletion layer 212 produced by a reverse bias voltage of 3 V spreads on both sides of a p-n junction formed between the n-type semiconductor region 12 and each of the p$^+$-type semiconductor region 62 and the p-type semiconductor regions 32 and 33. The depletion layer 212 becomes irrelevant to values of resistive elements forming the bridge. Therefore, a bad influence is not exerted upon improvement in accuracy or reliability.

Figure 5:
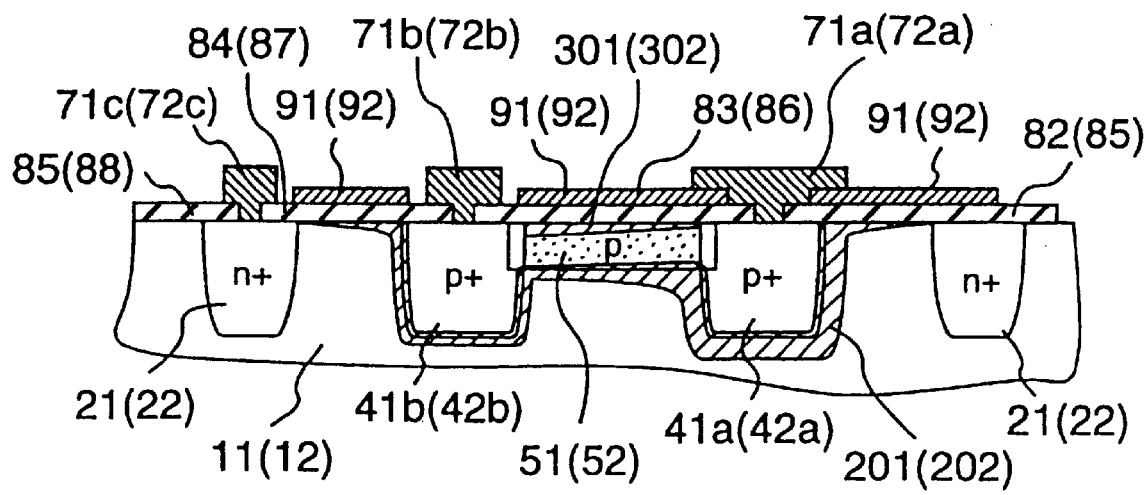
FIG. 5 is a diagram illustrating the operation of the first embodiment of the present invention in detail.
Figure 6:
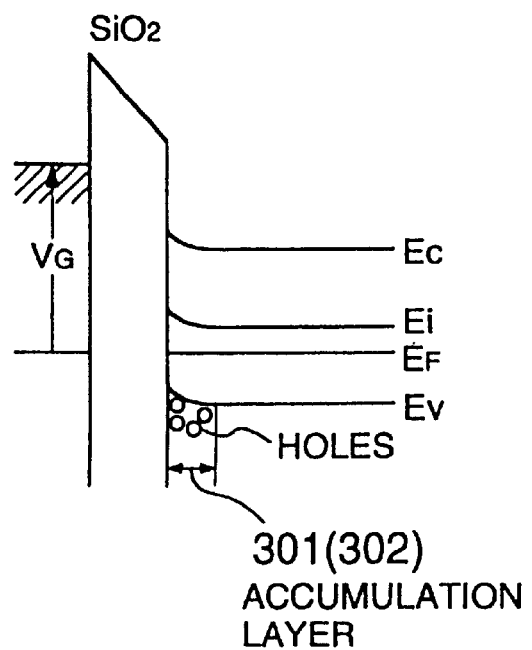
FIG. 6 is an energy band diagram on a p-layer surface of the first embodiment of the present invention.
Figure 7:
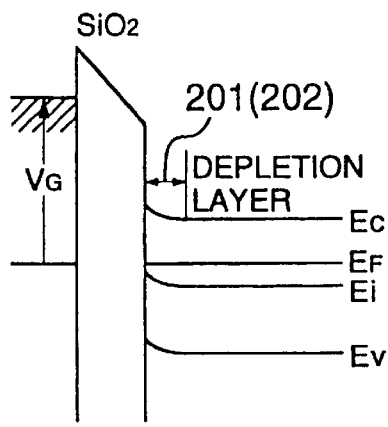
FIG. 7 is an energy band diagram on an n-layer surface of the first embodiment of the present invention.

FIGS. 5 through 7 are detailed diagrams illustrating that the present invention is effective in improving accuracy and reliability. FIG. 5 shows the case where 71a is at ground potential and 71b and 71c are at a potential of 1.5 V. First of all, the inside of the semiconductor will be described. The n-type semiconductor region 11 is at a potential of 1.5 V. The p$^+$-type semiconductor region 41a is at ground potential. Between the n-type semiconductor region 11 and the p$^+$-type semiconductor region 41a, therefore, a reverse bias voltage of 1.5 V is applied. However, the n-type semiconductor region 11 and the p$^+$-type semiconductor region 41b have the same potential. Therefore, the depletion layer 201 spreads largely on the side of the p$^+$-type semiconductor region 41a. The width of the depletion layer spreading on both sides of the p-n jucntion formed between the p-type semiconductor region 51 and the n-type semiconductor region 11 becomes narrower as the location approaches the p$^+$-type semiconductor region 41b. On the side of the p$^+$-type semiconductor region 41b, the width becomes the width of the depletion layer existing in the thermal equilibrium state. Among such depletion layers, the depletion layer spreading in the n-type semiconductor region is irrelevant to the resistance value. The depletion layer spreading in the p-type semiconductor region 52 functioning as a piezoresistive element narrows the passage through which a current flows and consequently increases the resistance value. In FIG. 5, characters in parentheses represent piezoresistive elements shown in the left part of FIG. 4. The spread of the depletion layer 202 within the semiconductor is completely the same as that of the depletion layer 201. The reason will now be described. Since the p$^+$-type semiconductor region 42a is at a potential of 1.5 V and the n-type semiconductor region 12 is at a potential of 3 V, a reverse bias voltage of 1.5 V is applied between the n-type semiconductor region 12 and the p$^+$-type semiconductor region 42a. Furthermore, since the n-type semiconductor region 12 and the p$^+$-type semiconductor region 42b have the same potential, the depletion layer 202 spreads largely on the side of the p$^+$-type semiconductor region 42a. The width of the depletion layer spreading on both sides of the p-n jucntion formed between the p-type semiconductor region 52 and the n-type semiconductor region 12 becomes narrower as the location approaches the p$^+$-type semiconductor region 42b. On the side of the p$^+$-type semiconductor region 42b, the width beomes the width of the depletion layer existing in the thermal equilibrium state.

Subsequently, the semiconductor surface will now be described. First of all, the surface on the p-type semiconductor region 51 will be described. If the electrode 71a and an electric conductor 91 keeping in contact with the electrode 71a are at ground potential and the electrode 71b is at a potential of 1.5 V, the p-type semiconductor region 51 has such a potential distribution that the right end thereof is at ground potential and the left end thereof is at a potential of 1.5 V. As a result, an electric field effect action is not effected between the surface of the right end of the p-type semiconductor region 51 and the electric conductor 91. An electric field effect action is effected between the electric conductor 91, having a negative potential of 1.5 V with respect to the surface of the left end, and the surface of the left end. As shown in FIG. 6, therefore, an accumulation layer 301 having holes accumulated therein is formed on the p-type semiconductor region. This accumulation layer 301 becomes significant as the location moves to the left in the p-type semiconductor region 51. In FIG. 6, $V_G$ represents the potential of the electric conductor 91 effectively having a negative potential with respect to the p-type semiconductor region 51.

The depletion layer spreading in the p-type semiconductor region 51 functioning as a piezoresistive element narrows the passage through which a current flows and consequently increases the resistance value. However, the accumulation layer formed on the p-type semiconductor region 51 functions to decrease the resistance value. As a whole, therefore, a change in resistance value is canceled.

The surface on the n-type semiconductor region 11 will now be described. If the electric conductor 91 is at ground potential and the electrode 71c is at a potential of 1.5 V, the n-type semiconductor region 11 is also at a potential of 1.5 V in the same way. As a result, an electric field effect action is effected between the surface of the n-type semiconductor region 11 and the electric conductor 91. As shown in FIG. 7, therefore, a depletion layer 201 depleted of electrons is formed on the n-type semiconductor region 11. In FIG. 7, $V_G$ represents the potential of the electric conductor 91 effectively having a negative potential with respect to the n-type semiconductor region 11. Since this depletion layer 201 is not in a current passage, it becomes irrelevant to values of resistive elements forming the bridge. Therefore, a bad influence is not exerted upon improvement in accuracy or reliability.

In the above, the operation of the piezoresistive element 51 included in RgT2 has been described referring to reference numerals in parenthesis shown in FIGS. 5, 6 and 7. Note that the operation of the piezoresistive element 52 included in RgL1 will be omitted as parts having non-parenthesized reference numerals correspond to those in parenthesis shown in FIGS. 5, 6 and 7, respectively, and function similarly.

Figure 8:
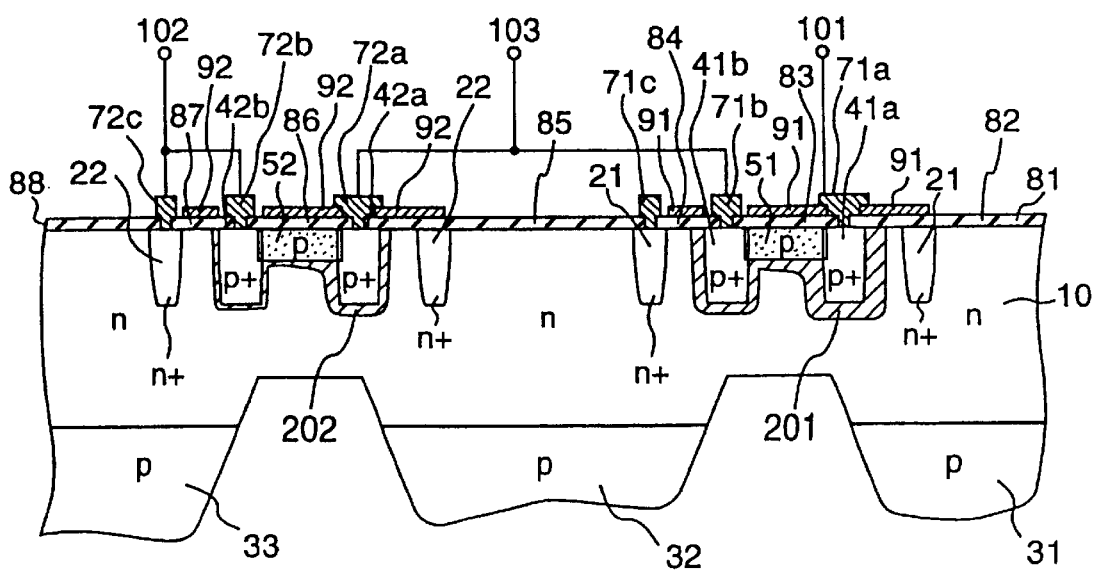
FIG. 8 is a diagram illustrating the operation in the case where the first embodiment of the present invention is not applied.

FIG. 8 is a diagram illustrating the operation of FIG. 4 referred to in description of the present invention in the case where the p$^+$-type semiconductor regions 61 and 62 each having a high impurity concentration are removed, and it is a schematic sectional view in the case where a voltage is applied across resistive elements connected in series. When the electrode terminal 101 is connected to ground potential and 3 V is applied to the electrode terminal 102, the potential of the electrode terminal becomes 1.5 V provided that the piezoresistive elements have the same value. In this case, a depletion layer 201 spreads on both sides of a p-n juction formed between an n-type semiconductor region 10 and a p-type semiconductor including the p$^+$-type semiconductor regions 41a and 41b and the piezoresistive element 51. The depletion layer 201 has a shape different from that of a depletion layer 202 spreading on both sides of a p-n juction formed between an n-type semiconductor region 10 and a p-type semiconductor including the p$^+$-type semiconductor regions 42a and 42b and the piezoresistive element 52. Basically, values of the piezoresistive elements 51 and 52 cannot be made equal to a predetermined value.

Figure 9:
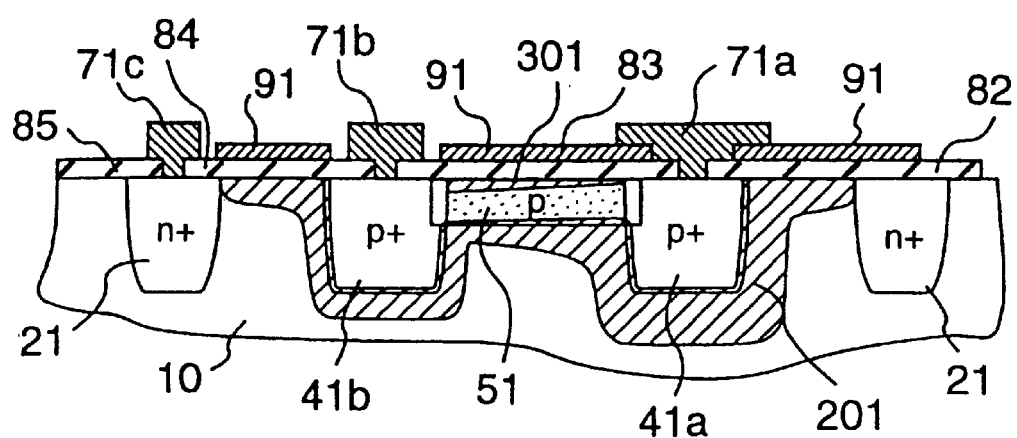
FIG. 9 is a detailed diagram illustrating the operation in the case where a reverse bias voltage is high in FIG. 8.
Figure 10:
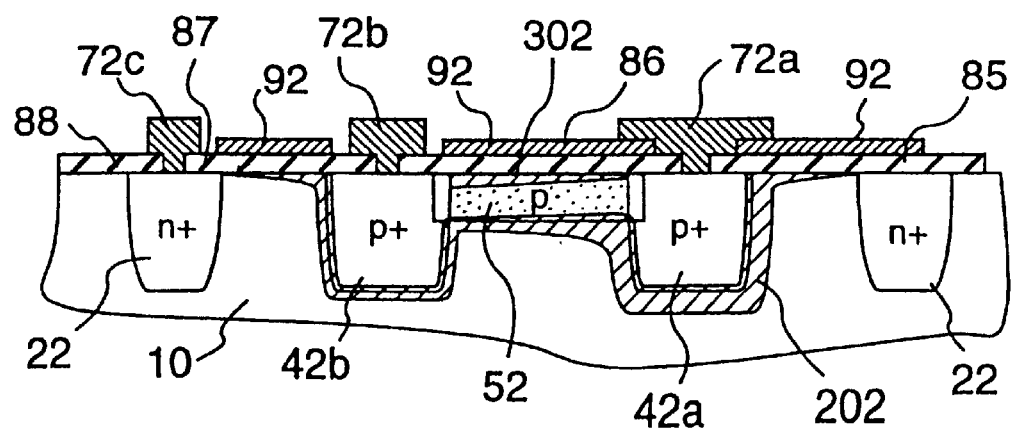
FIG. 10 is a detailed diagram illustrating the operation in the case where the reverse bias voltage is low in FIG. 8.

The reason will now be described in detail by referring to FIGS. 9 and 10. FIG. 9 shows the case where 71a is at ground potential 71b is at a potential of 1.5 Volts equivalent to that of the electrode terminal 103, and 71c are at a potential of 3 V equivalent to that of the electrode terminal 102. First of all, the inside of the semiconductor will now be described. The n-type semiconductor region 10 is at a potential of 3 V, and the p$^+$-type semiconductor region 41a is at ground potential. Between the n-type semiconductor region 10 and the p$^+$-type semiconductor region 41a, therefore, a reverse bias voltage of 3 V is applied. However, the n-type semiconductor region 10 is at 3V and the p$^+$-type semiconductor region 41b is at 1.5 V. Therefore, the depletion layer 201 spreads largely on the side of the p$^+$-type semiconductor region 41a. The width of the depletion layer spreading on both sides of the p-n junction formed between the p-type semiconductor region 51 and the n-type semiconductor region 10 becomes narrower as the location approaches the p$^+$-type semiconductor region 41b. On the side of the p$^+$-type semiconductor region 41b, the width beomes the depletion layer width spread by a reverse bias voltage of 1.5 V. Among such depletion layers, the depletion layer spreading in the n-type semiconductor region is irrelevant to the resistance value. The depletion layer spreading in the p-type semiconductor region 51 functioning as a piezoresistive element narrows the passage through which a current flows and consequently increases the resistance value. FIG. 10 shows the case where 72a is at a potential of 1.5 V and 72b and 72c are at a potential of 3 V equivalent to that of the electrode terminal 102. Since the n-type semiconductor region 10 is at a potential of 3 V and the p$^+$-type semiconductor region 42a is at a potential of 1.5 V, and a reverse bias voltage of 1.5 V is applied between the n-type semiconductor region 10 and the p$^+$-type semiconductor region 42a. Since the n-type semiconductor region 10 is at a potential of 3 V and the p$^+$-type semiconductor region 42b is at a potential of 3 V, however, the depletion layer 202 spreads largely on the side of the p$^+$-type semiconductor region 42a. The width of the depletion layer spreading on both sides of the p-n junction formed between the p-type semiconductor region 51 and the n-type semiconductor region 10 becomes narrower as the location approaches the p$^+$-type semiconductor region 42b. On the side of the p$^+$-type semiconductor region 42b, the width beomes the depletion layer width spreading in the thermal equilibrium state.

As heretofore described, the width of the depletion layer 201 is largely different from that of the depletion layer 202. Especially, the width of the depletion layer spreading in the p-type semiconductor region 51 functioning as the piezoresistive element is wider than the width of the depletion layer spreading in the p-type semiconductor region 52. Even if resistive elements eventually having the same diffusion shape are formed, the substantial resistance value of the p-type semiconductor region 51 becomes higher than the resistance value of the p-type semiconductor region 52. Even if a pressure is not applied, therefore, the balance of the resistance bridge circuit shown in FIG. 3 is lost and consequently a pressure sensor having high accuracy is not obtained.

The semiconductor surface will now be described. First of all, the surface on the p-type semiconductor regions 51 and 52 is nearly the same as that described with reference to FIGS. 5 and 6 and will not be described. The surface on the n-type semiconductor region 10 will now be described. If the electric conductor 91 is at ground potential and the electrode 71c is at a potential of 3 V, the n-type semiconductor region 10 is also at a potential of 3 V in the same way. As a result, an electric field effect action of 3 V is effected between the surface of the n-type semiconductor region 10 and the electric conductor 91. As shown in FIG. 9, therefore, a depletion layer 201 depleted of electrons is formed on the n-type semiconductor region 10 located directly under the electric conductor 91. As shown in FIG. 10, however, the electric conductor 92 is at a potential of 1.5 V and the n-type semiconductor region 10 is at a potential of 3 V. Between the surface of the n-type semiconductor region 10 and the electric conductor 91, an electric field effect action of 1.5 V is effected. Therefore, the width of the depletion layer 202 on the surface of the n-type semiconductor region 10 becomes narrower than the depletion layer 201. Since the leak current, for example, is proportionate to the volume in the depletion layer, the leak current of the resistive element including the p-type semiconductor region 51 becomes larger than that of the resistive element including the p-type semiconductor region 52. An imbalance is thus caused in leak currents of the resistive elements forming the bridge. As a result, a bad influence is exerted upon improvement in accuracy and reliability.

Figure 11A:
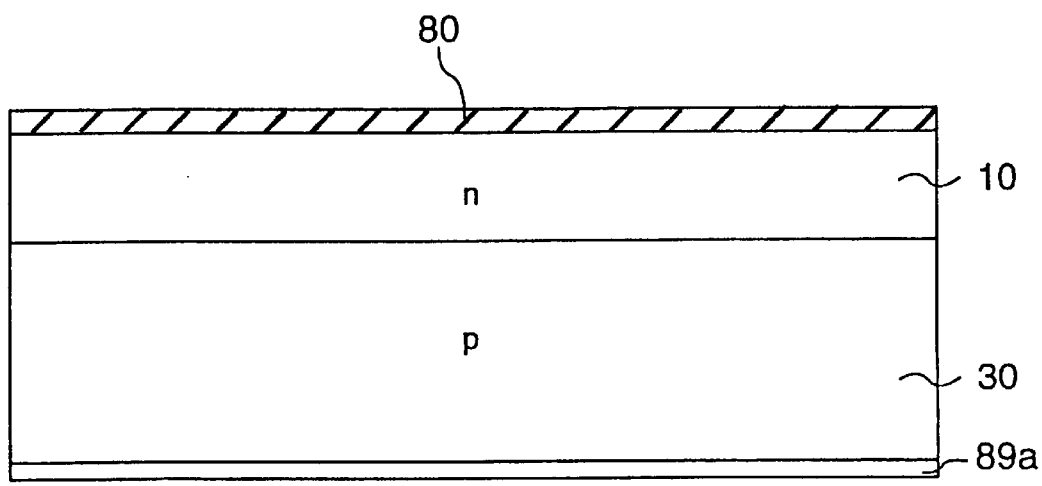
FIGS. 11A through 11J are sectional views showing the fabrication process of the first embodiment shown in FIG. 1.
Figure 11B:
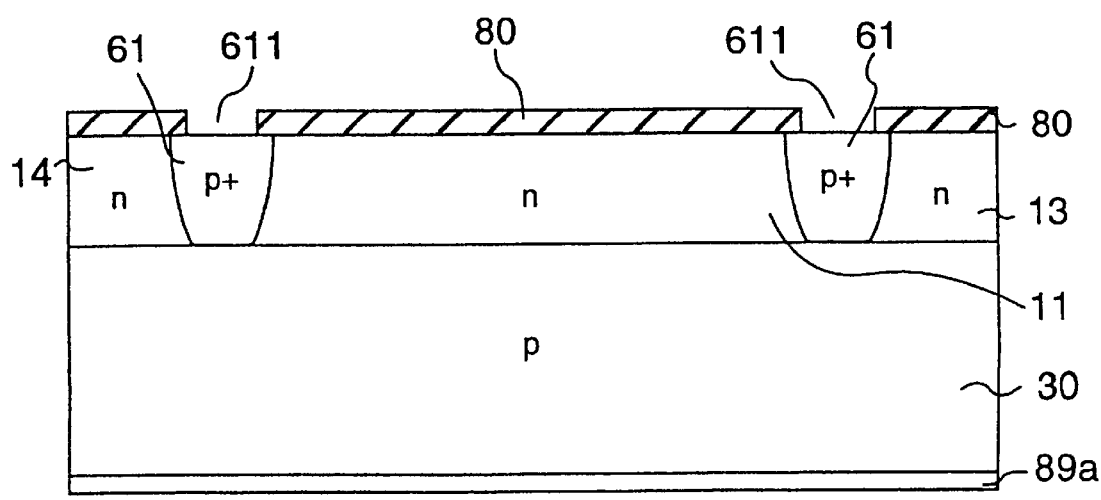
Figure 11C:
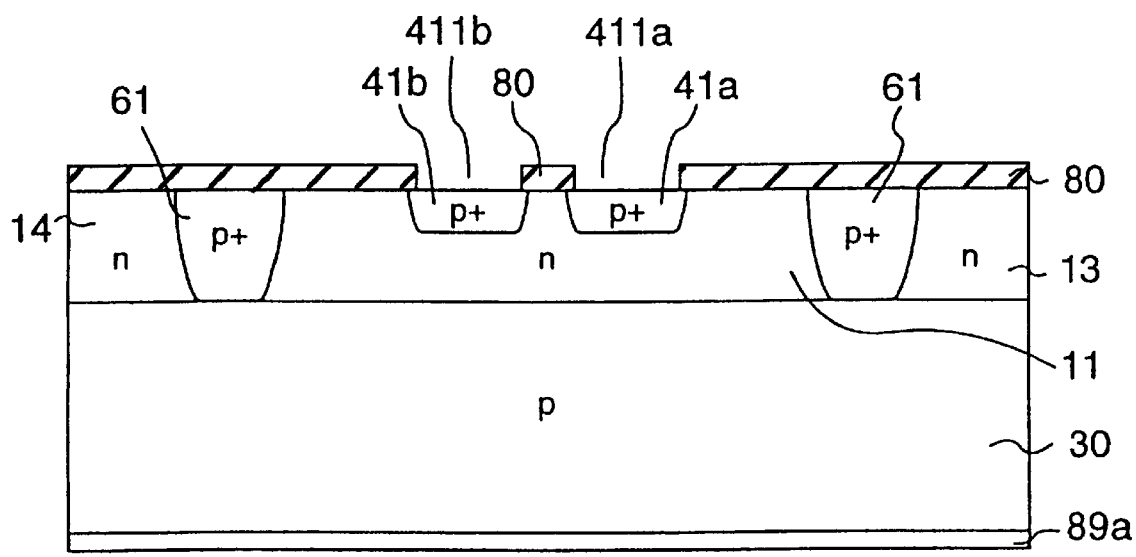
Figure 11D:
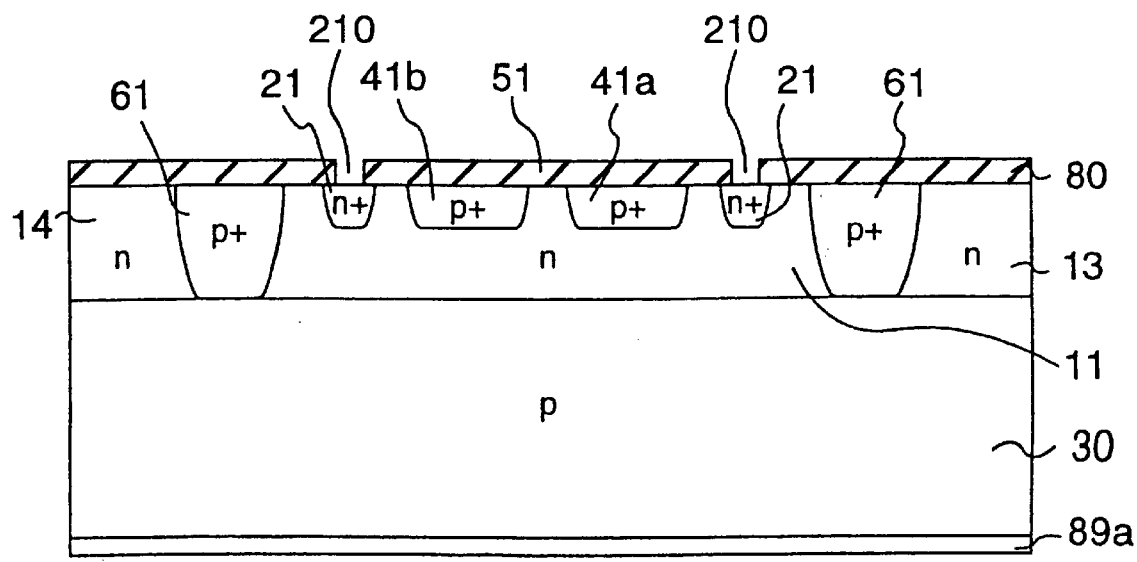
Figure 11E:
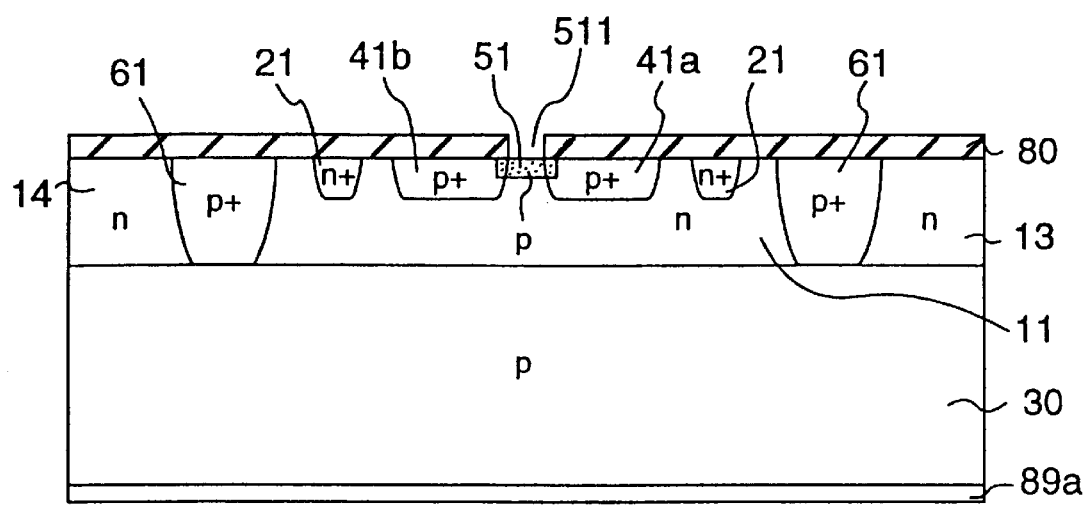
Figure 11F:
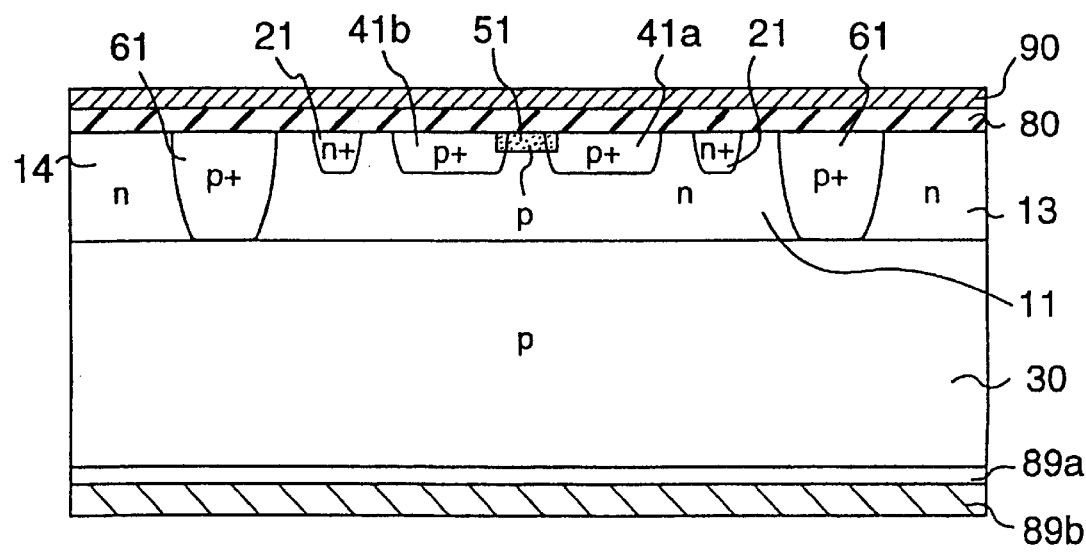
Figure 11G:
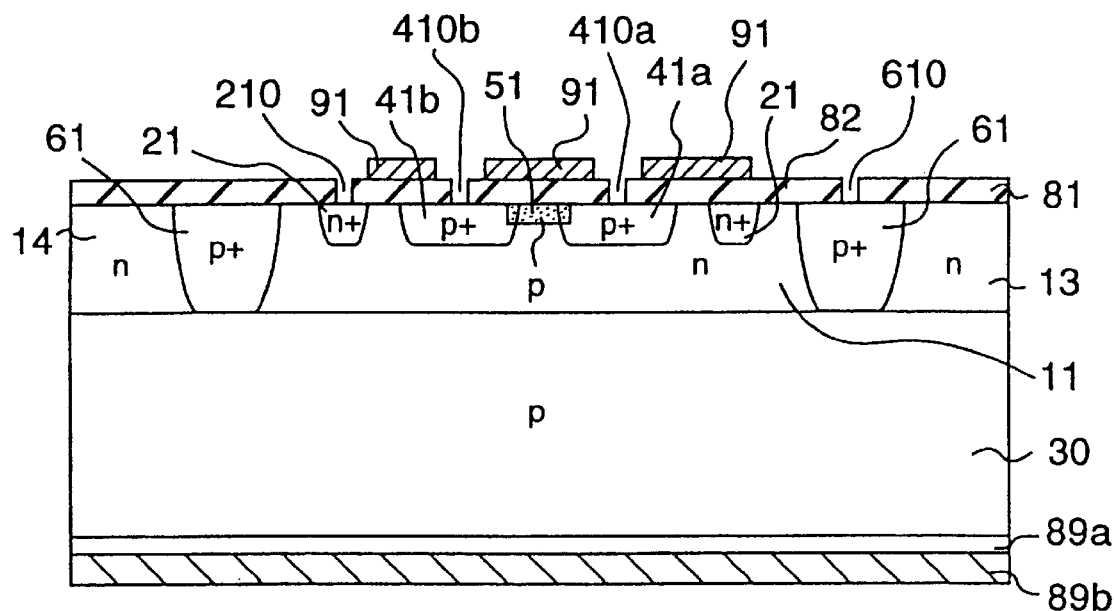
Figure 11H:
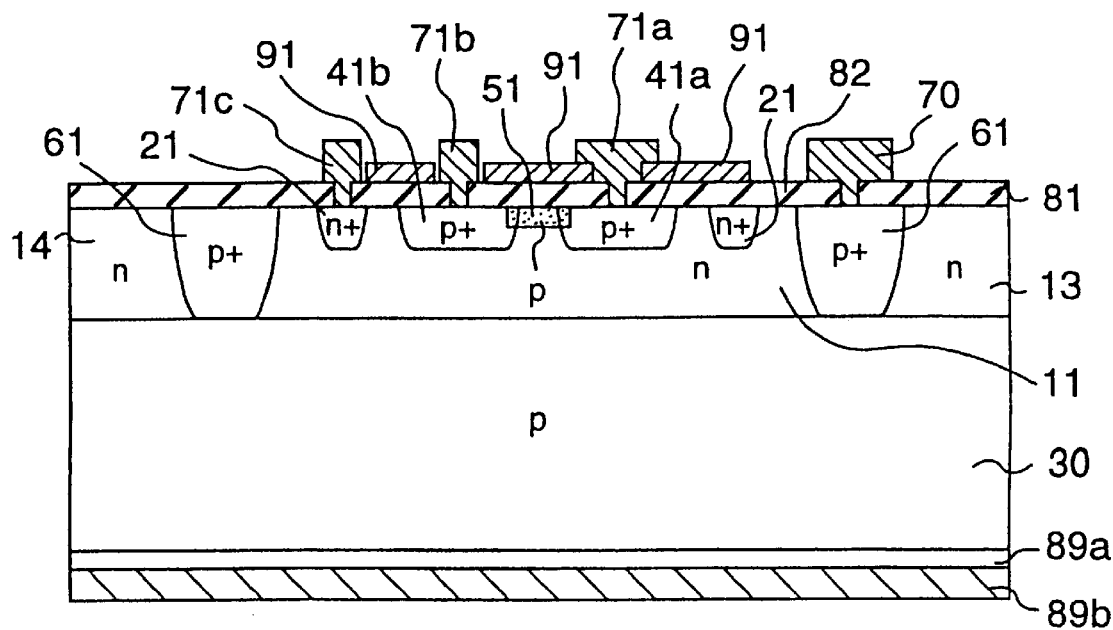
Figure 11I:
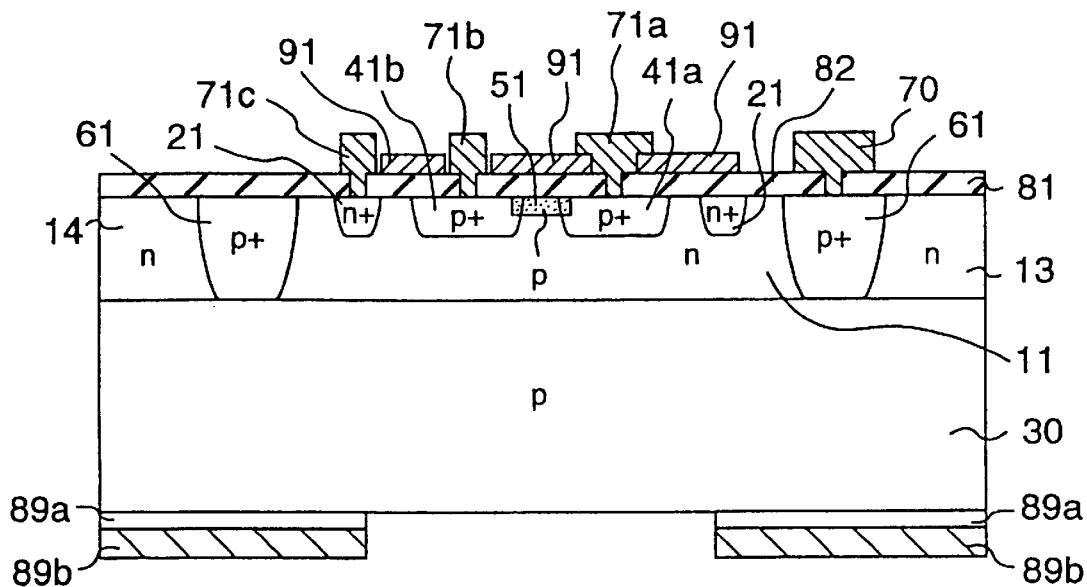
Figure 11J:
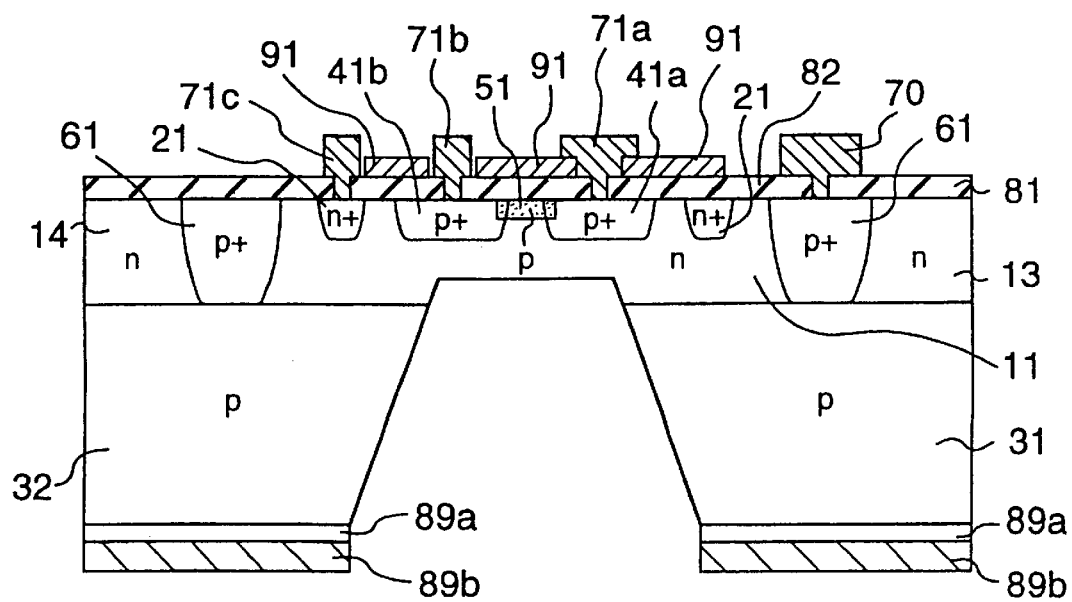

A method for fabricating a semiconductor composite sensor according to the present invention will now be described. FIGS. 11A, 11B, 11C, 11D, 11E, 11F, 11G, 11H, 11I and 11J show respective successive processing steps of a fabrication method for a semiconductor composite sensor according to the present invention shown in FIG. 1. As shown in FIG. 11A, a Si wafer having the n-type semiconductor region 10 formed on a p-type semiconductor region 30 by epitaxial growth is first subjected to thermal oxidation to form a silicon dioxide film 80 on the obverse and form a silicon dioxide film 89a on the reverse. As shown in FIG. 11B, openings are formed in portions of the silicon dioxide film 80 on the obverse by using the conventional photoetching technique. In the openings 611, impurities such as boron are doped by using the ion implantation method or the thermal diffusion method. The p$^+$-type semiconductor regions 61 each having a high impurity concentration are thus formed so as to be linked with the p-type semiconductor region 30. As shown in FIG. 11C, openings are then formed in portions of the silicon dioxide film 80 on the obverse by using the conventional photoetching technique. In the openings 411a and 411b, impurities such as boron are doped by using the ion implantation method or the thermal diffusion method. The p$^+$-type semiconductor regions 41a and 41b, each having a high impurity concentration, are thus formed. As shown in FIG. 11D, openings are then formed in portions of the silicon dioxide film 80 on the obverse by using the conventional photoetching technique. In the openings 210, impurities such as phosphorus are doped by using the ion implantation method or the thermal diffusion method. The n$^+$-type semiconductor regions 21 each having a high impurity concentration, are thus formed. As shown in FIG. 11E, openings are then formed in portions of the silicon dioxide film 80 on the obverse by using the conventional photoetching technique. In the opening 511, impurities such as boron are doped by using the ion implantation method or the thermal diffusion method. The p-type semiconductor region 51 functioning as a piezoresistive element is thus formed. As shown in FIG. 11F, the electric conductor film 90, such as a polycrystal silicon film or so-called doped polycrystal silicon film containing impurities such as phosphorus or boron, is then formed on the silicon dioxide film 80 on the obverse by using the CVD method using monosilane as a principal raw material, the plasma CVD method, or the plasma CVD method using a microwave. On the reverse, a silicon nitride film 89b is formed by using the plasma CVD method. As shown in FIG. 11G, the electric conductor film 90 formed on the obverse is then worked by using the conventional photoetching technique to form electric conductor films 91 each having a predetermined size. Among the silicon dioxide films formed on the semiconductor obverse, openings are formed in portions of the semiconductor regions 61, 41a, 41b and 21, each having a high impurity concentration and openings 610, 410a, 410b and 210 are thus formed. As shown in FIG. 11H, metal such as aluminum, is evaporated on semiconductor regions, each having a high impurity concentration, of the above described openings by using the conventional sputtering method. The electrodes 70, 71a, 71b and 71c are formed so as to have respective predetermined shapes by using photoetching. As shown in FIG. 11I, at least a portion of the silicon nitride film 89b and the silicon dioxide film 89a of the reverse located directly under the piezoresistive element 51 is worked by using conventional photolithography or dry etching. An opening 300 is thus formed on the p-type semiconductor region 30. Finally, as shown in FIG. 11J, the p-type semiconductor region 30 is etched via the opening 300 by using alkaline etching or dry etching to fabricate a semiconductor composite sensor.

Figure 12:
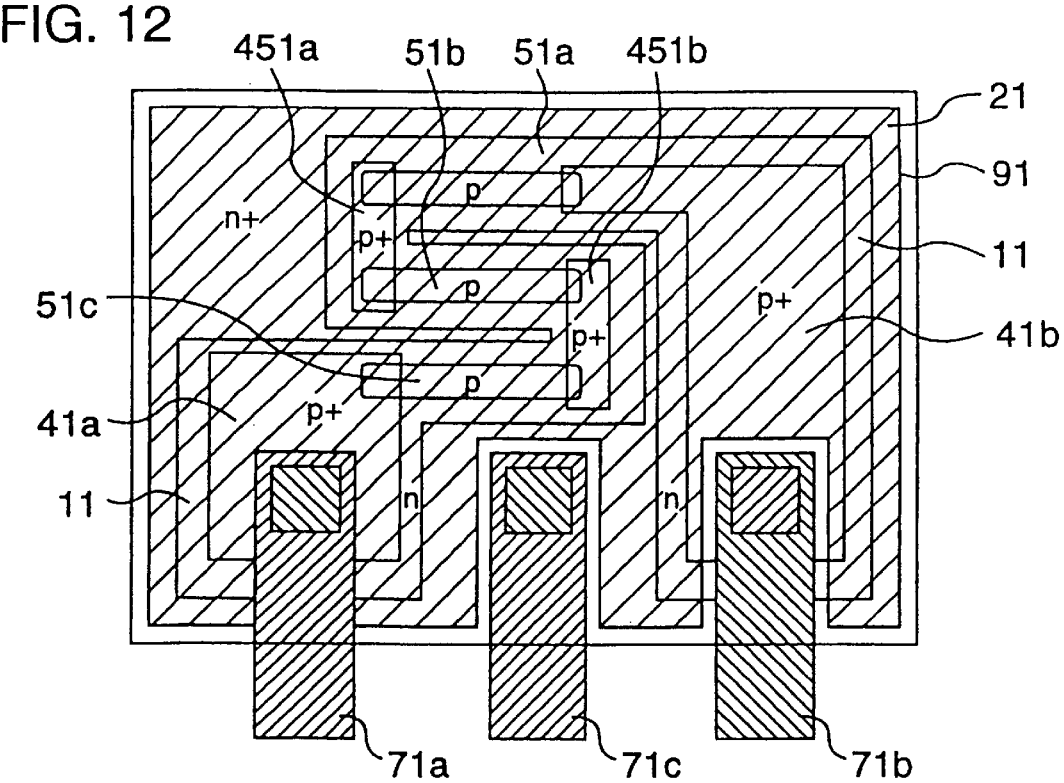
FIG. 12 is a top view of a first resistor element used for the present invention.
Figure 13:
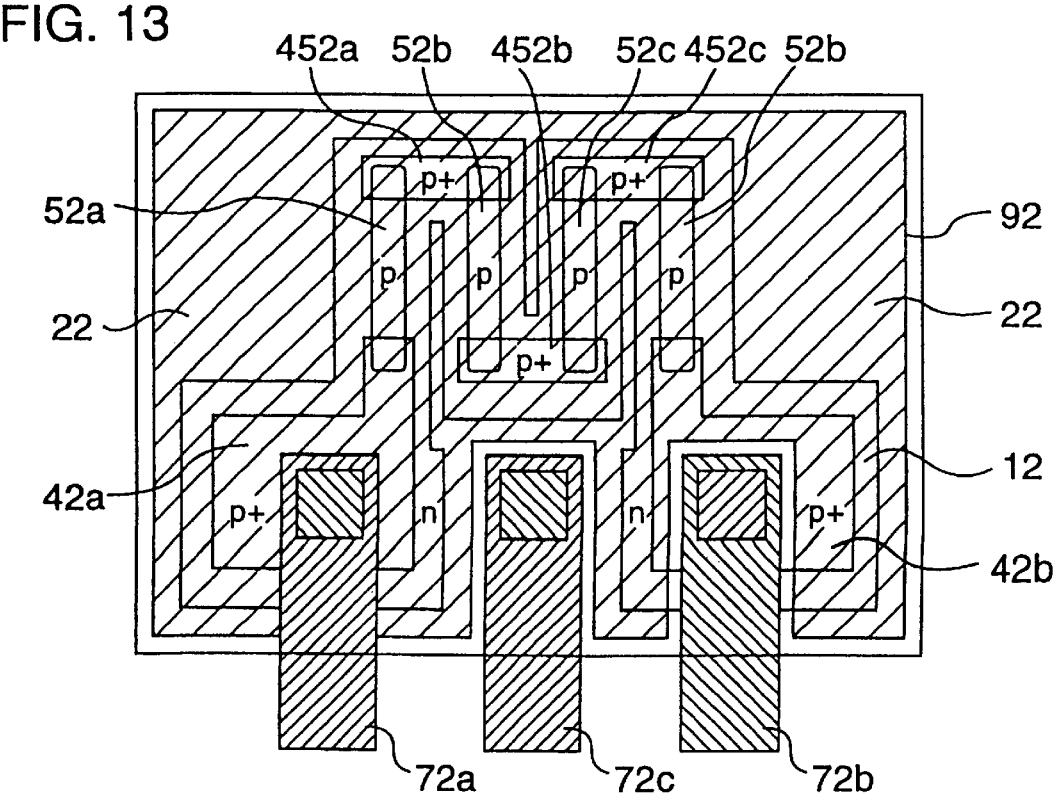
FIG. 13 is a top view of a second resistor element used for the present invention.

FIGS. 12 and 13 are top view patterns seen from the surface of piezoresistive elements shown in FIG. 3. FIG. 12 corresponds to RgL1 and RgL2 of FIG. 3, whereas FIG. 13 corresponds to RgT1 and RgT2 of FIG. 3. Among characters shown in FIGS. 12 and 13, characters identical with those shown in FIGS. 1 and 2 will not be described. In FIG. 12, the piezoresistive element 51 of the p-type semiconductor region shown in FIG. 1 is divided into three parts: 51a, 51b and 51c. Furthermore, p+-type semiconductor regions 451a and 451b, each having a high impurity concentration, are newly added in order to link 51a with 51b and link 51b with 51c. As shown in FIG. 12, the n+-type semiconductor region 21 having a high impurity concentration is formed so as to surround the p-type semiconductor regions 51a, 51b and 51c and the p+-type semiconductor regions 41a, 41b, 451a and 451b via the n-type semiconductor region 11. Even if the surface of the n-type semiconductor region 11 should be inverted to p-type, such an arrangement prevents occurrence of the problem that the piezoresistive elements 51a, 51b and 51c are connected and consequently the resistance value is significantly reduced. Furthermore, the electric conductor 91 is connnected to the electrode 71a and the electrodes 71b and 71c are isolated, the electric conductor 91 and the electrode 71a are at the same potential. As seen from the surface of the electric conductor 91, the electric conductor 91 covers surfaces of the piezoresistive elements 51a, 51b and 51c and the n-type semiconductor region 11. Therefore, the charge possessed by the external atmosphere such as moisture or other contaminants can be shielded, high reliability being thus achieved.

In FIG. 13, the piezoresistive element 52 of the p-type semiconductor region shown in FIG. 1 is divided into four parts: 52a, 52b, 52c and 52d. Furthermore, p+-type semiconductor regions 452a, 452b and 452c, each having a high impurity concentration, are newly added in order to link 52a with 52b, link 52b with 52c and link 52c with 52d. Other operations are the same as those described with reference to FIG. 12 and will not be described.

Figure 14:
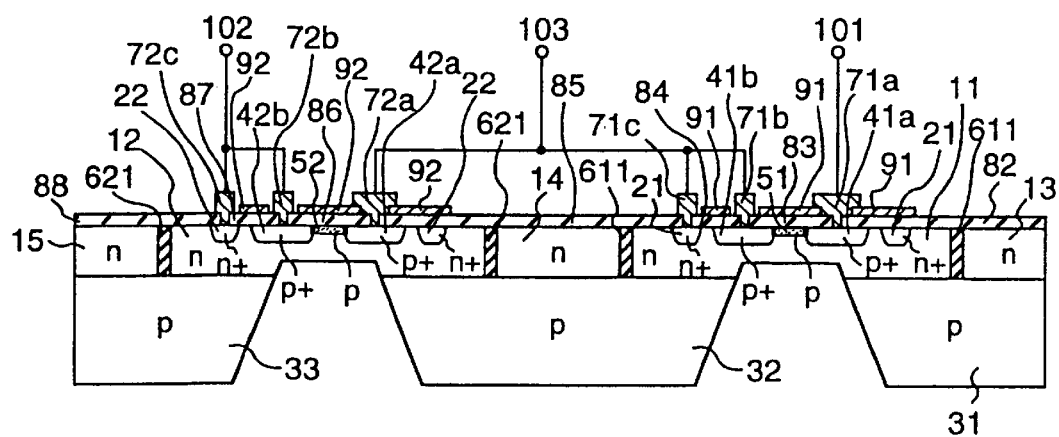
FIG. 14 is a sectional view showing a second embodiment of the present invention.
Figure 15:
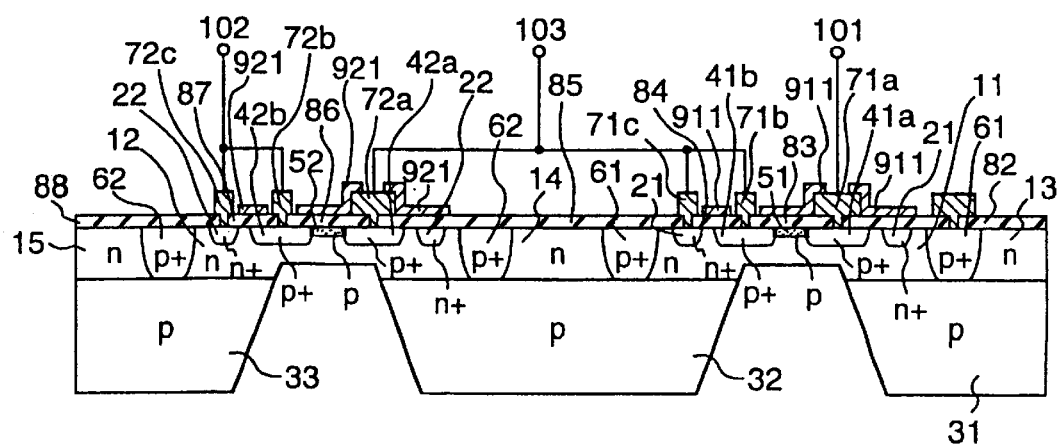
FIG. 15 is a sectional view showing a third embodiment of the present invention.
Figure 16:
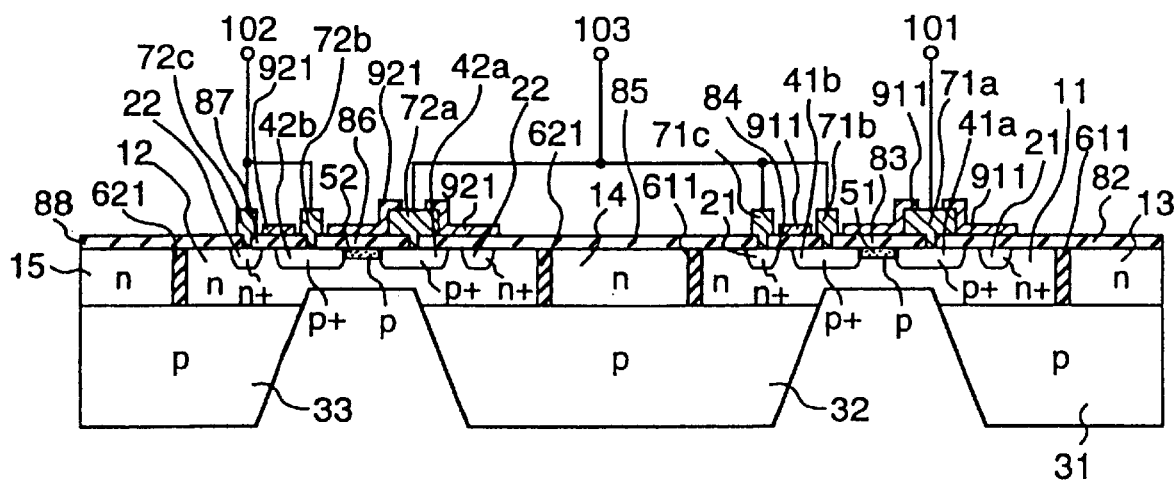
FIG. 16 is a sectional view showing a fourth embodiment of the present invention.

FIGS. 14 through 16 are sectional views respectively showing second, third and fourth embodiments of the present invention. In FIGS. 14 through 16, components denoted by the same characters as those of FIG. 1 will not be described. By referring to FIGS. 1 and 4 according to the present invention, features and operations of the present invention have been described in detail. Instead of the p+-type semiconductor regions 61 and 62 shown in FIG. 1 according to the present invention, insulators 611 and 621 shown in FIG. 14 may be used. When in the presence of the insulators the electrode terminal 101 is at ground potential and a voltage of 3 V is applied to the electrode terminal 102, the potential difference between the n-type semiconductor region 11 and the p+-type semiconductor region 41a having a high impurity concentration becomes 1.5 V and the potential difference between the n-type semiconductor region 12 and the p+-type semiconductor region 42a having a high impurity concentration equally becomes 1.5 V. A semiconductor composite sensor having high accuracy and high reliability can thus be obtained.

In FIG. 1 showing the first embodiment of the present invention, the electric conductors 91 and 92, each having a shield function, are formed under the electrodes 71a and 72a, respectively. Even if elecric conductors 911 and 921 are formed respectively above the electrodes 71a and 72a as shown in FIG. 15, the effects of the present invention can be achieved. Since in this case the electric conductors can be disposed after the electrodes 71a and 72a have been disposed, process steps for semiconductor fabrication can be simplified.

FIG. 16 shows an embodiment using the insulators 611 and 621 shown in FIG. 14 and the electric conductors 911 and 921 formed respectively above the electrodes 71a and 72a. In each of FIGS. 14 through 16, a highly accurate and highly reliable semiconductor composite sensor, which is a feature of the present invention, can be derived.

Figure 17:
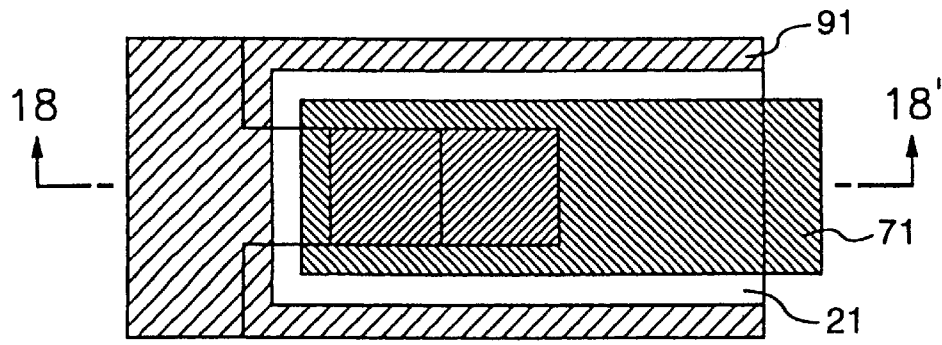
FIG. 17 is a top view showing a first embodiment of a contact portion of a resistive element according to the present invention.
Figure 18:
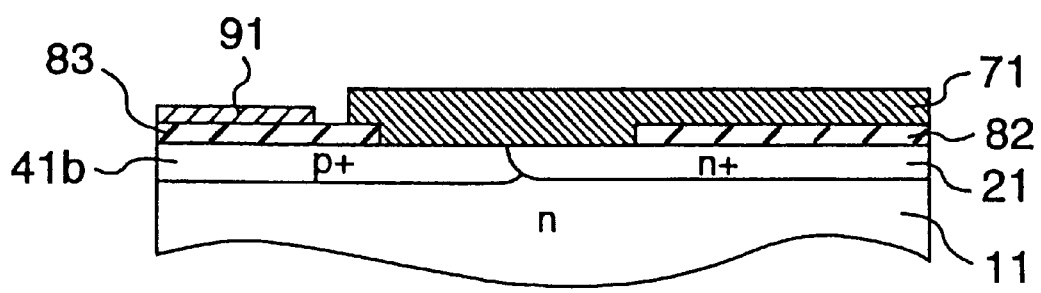
FIG. 18 is a sectional view showing the first embodiment of the contact portion of the resistive element according to the present invention.

FIG. 17 is a top view showing a first embodiment of a contact portion of a piezoresistive element. FIG. 18 is a sectional view seen along a line A–A' in FIG. 17. In the contact portion shown in FIGS. 17 and 18, the electrode 71b and the electrode 71c connected to the same potential shown in FIG. 1 are formed as a common electrode 71. As shown in FIG. 17, the electrode 71 is isolated from the electric conductor 91. As shown in FIG. 18, the n+-type semiconductor region 21 having a high impurity concentration is connected to the p+-type semiconductor region 41b. By doing so, an advantage that electrodes can be taken out easily is obtained.

Figure 19:
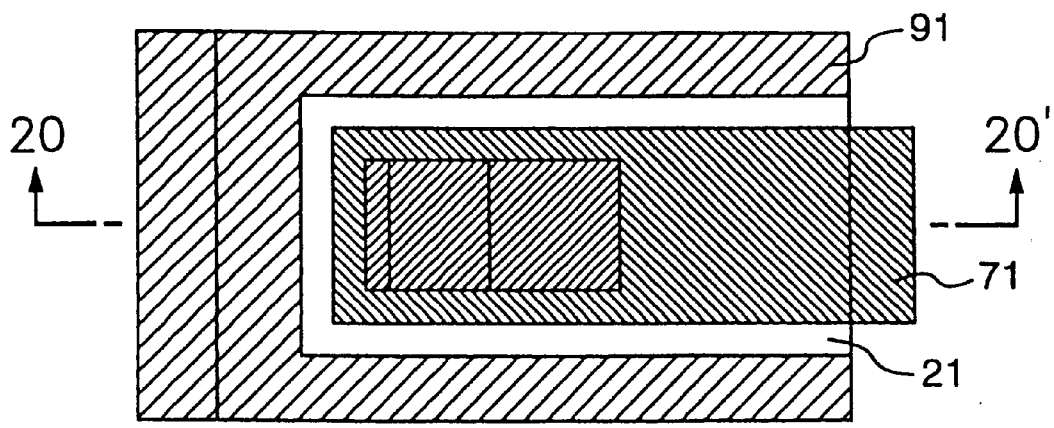
FIG. 19 is a top view showing a second embodiment of a contact portion of a resistive element according to the present invention.
Figure 20:
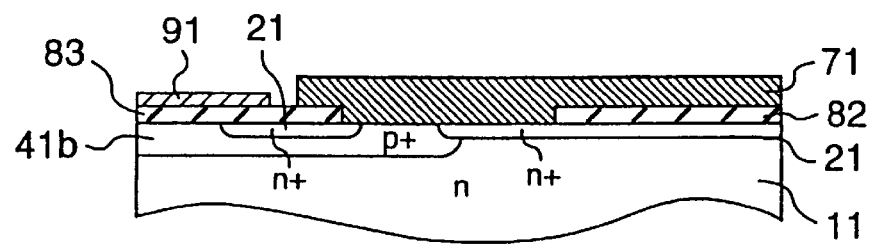
FIG. 20 is a sectional view showing the second embodiment of the contact portion of the resistive element according to the present invention.

FIG. 19 is a top view showing a second embodiment of a contact portion of a piezoresistive element. FIG. 20 is a sectional view seen along a line B–B' in FIG. 19. In the contact portion shown in FIGS. 19 and 20 as well, the electrode 71b and the electrode 71c connected to the same potential shown in FIG. 1 are formed as a common electrode 71. As shown in FIG. 19, the electrode 71 is isolated from the electric conductor 91. As shown in FIG. 20, the n+-type semiconductor region 21 is formed shallower than the p+-semiconductor region 41b and the n+-type semiconductor region 21 is connected to the p+-semiconductor region 41b. By doing so, not only an advantage that electrodes can be taken out easily is obtained, but also the type of region having a high impurity concentration which is not covered by an electrode can be made only n-type. Thus, higher reliability can be achieved. The reason will now be described. As for the impurity concentration, the n-type semiconductor region can be made to have a higher impurity than the p-type semiconductor region. In an insulating film, for example, a harmful substance, such as sodium ions, having positive charge exists. On the surface of the n+-type semiconductor region having a high impurity concentration, a so-called accumulation layer having more electrons stored therein than in the substrate is formed. This results in an advantage that a risk of an increase in leak current or occurrence of an imbalance in the resistance bridge circuit is completely eliminated.

Figure 21:
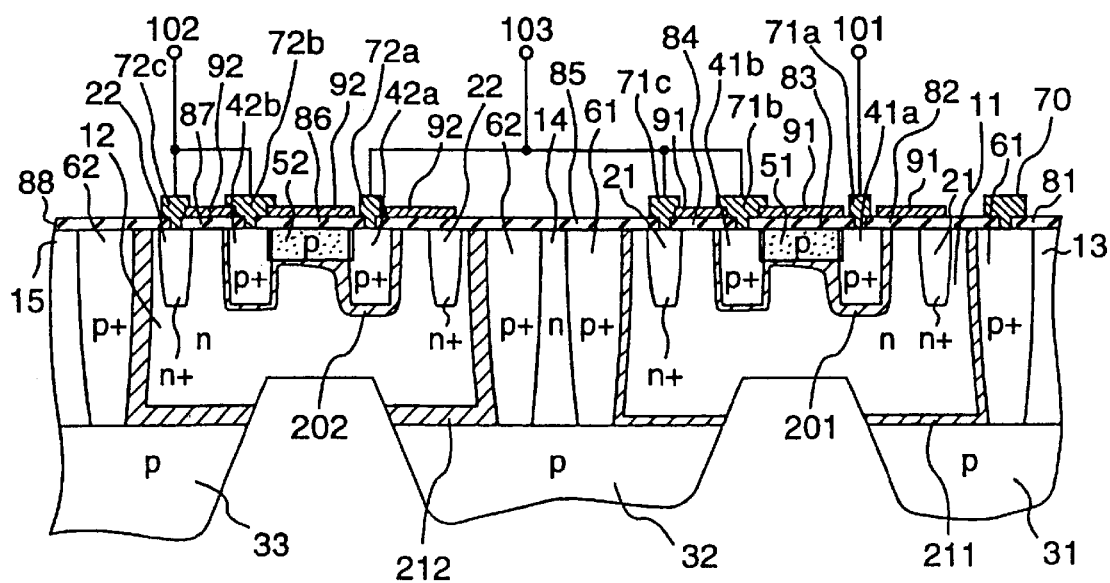
FIG. 21 is a diagram illustrating the operation of a fifth embodiment of the present invention.
Figure 22:
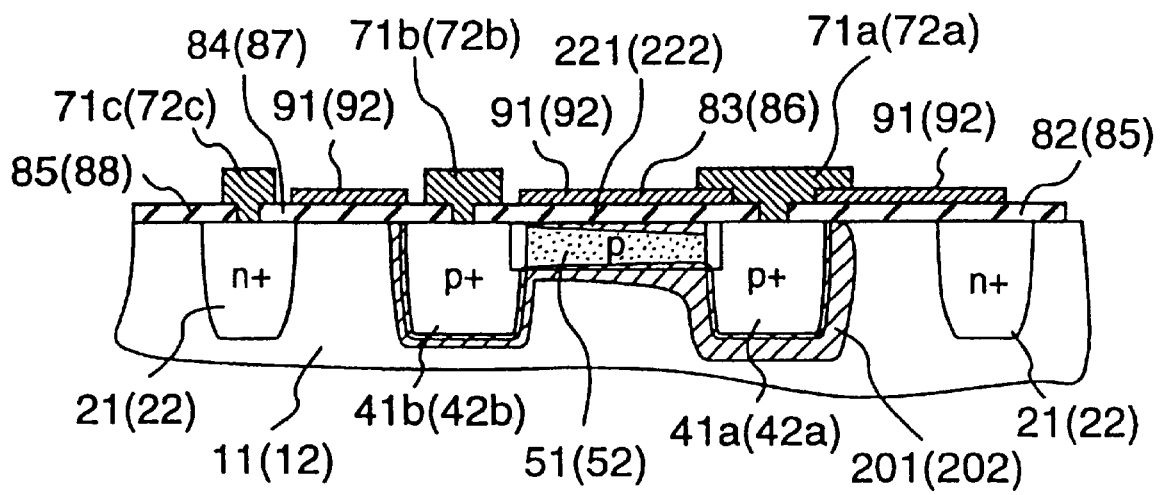
FIG. 22 is a diagram illustrating the operation of the fifth embodiment of the present invention in detail.

FIG. 21 is a diagram illustrating the operation of a fifth embodiment of the present invention. In FIG. 21, components having the same characters as those of FIG. 1 will not be described. In FIG. 1 showing the first embodiment according to the present invention, the electric conductors 91 and 92 serving as the shield layer are connected to the electrodes 71a and 72a, i.e., electrodes of lower potential side of two piezoresistive elements connected in series. The embodiment shown in FIG. 21 has a feature that the electric conductor 91 is connected to electrodes of high potential side. In the case where the electric conductor 91 is connected to the electrodes of low potential side, depletion layers are formed on the surface of the n-type semiconductor as described with reference to FIG. 5. In the case where the electric conductor 91 is connected to the electrodes of high potential side, there are no changes in spread of the depletion layers 201, 211, 202 and 212 within the semiconductor, but there is a difference in that an accumulation layer is formed on the surface of the n-type semiconductor. Details thereof will now be described by referring to FIGS. 22 through 24. FIG. 22 shows the case where 71a is at ground potential and 71b and 71c are at a potential of 1.5 V. The inside of the semiconductor is identical to that described with reference to FIG. 5 and will not be described.

Figure 23:
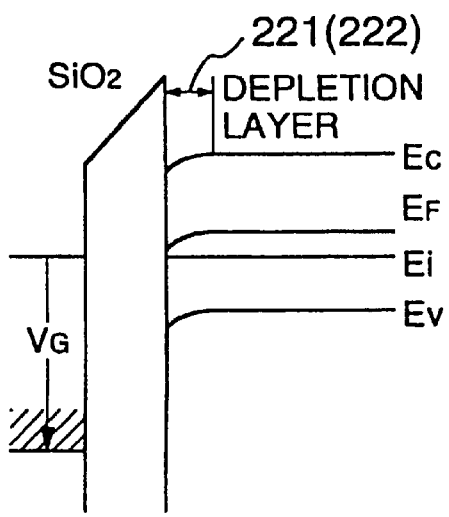
FIG. 23 is an energy band diagram on a p-layer surface of the fifth embodiment of the present invention.

Therefore, the semiconductor surface which differs from that of FIG. 5 will now be described. First of all, the semiconductor surface on the p-type semiconductor region 51 will now be described. If each of the electrode 71b and the electric conductor 91 keeping in contact with the electrode 71b is at a potential of 1.5 V and the electrode 71a is at ground potential, the p-type semiconductor region 51 has such a potential distribution that the right end thereof is at ground potential and the left end thereof is at a potential of 1.5 V. As a result, an electric field effect action is not effected between the surface of the left end of the p-type semiconductor region 51 and the electric conductor 91. An electric field effect action is effected between the electric conductor 91 having a positive potential of 1.5 V with respect to the surface of the right end and the surface of the right end. As shown in FIG. 23, therefore, an accumulation layer 221 depleted of holes is formed on the p-type semiconductor region. This depletion layer 221 becomes significant as the location moves to the right in the p-type semiconductor region 51. In FIG. 23, $V_G$ represents the potential of the electric conductor 91 effectively having a positive potential with respect to the p-type semiconductor region 51.

Figure 24:
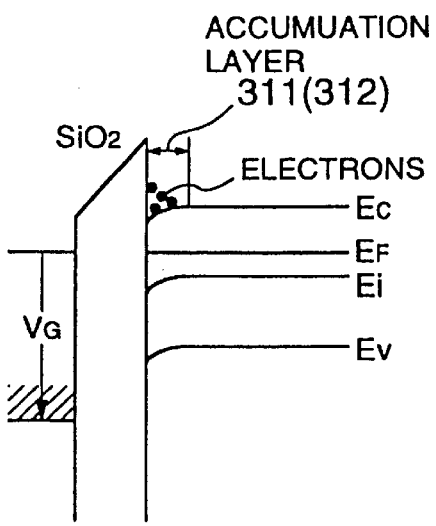
FIG. 24 is an energy band diagram on an n-layer surface of the fifth embodiment of the present invention.

The semiconductor surface on the n-type semiconductor region 11 will now be described. If each of the electric conductor 91 and the electrodes 71b and 71c is at a potential of 1.5 V, the n-type semiconductor region 11 is at a potential of 1.5 V in the same way. As a result, an electric field effect action is not effected between the surface of the n-type semiconductor region 11 and the electric conductor 91. However, the surface of the depletion layer 201 is at a potential between ground potential and 1.5 V. Between the surface of the depletion layer 201 and the electric conductor 91, it can be considerd as if an accumulation layer 311 having electrons accumulated therein is formed on the n-type semiconductor region 11 as shown in FIG. 24. In other words, the electric conductor 91 functions to limit the spread of the depletion layer on the surface of the n-type semiconductor region. In FIG. 24, $V_G$ represents the potential of the electric conductor 91 effectively having a positive potential with respect to the n-type semiconductor region 11. Since this apparent accumulation layer 311 functions to prevent p-inversion on the surface of the n-type semiconductor region, a plurality of p-type semiconductor regions serving as piezoresistive elements are prevented from being linked and thus the resistance value is prevented from being lowered. This apparent accumulation layer effectively improves accuracy and reliability.

Characters inside and outside parentheses shown in FIGS. 22 through 24 have the same function. Thus, they are completely the same, and the description will be omitted.

Figure 25:
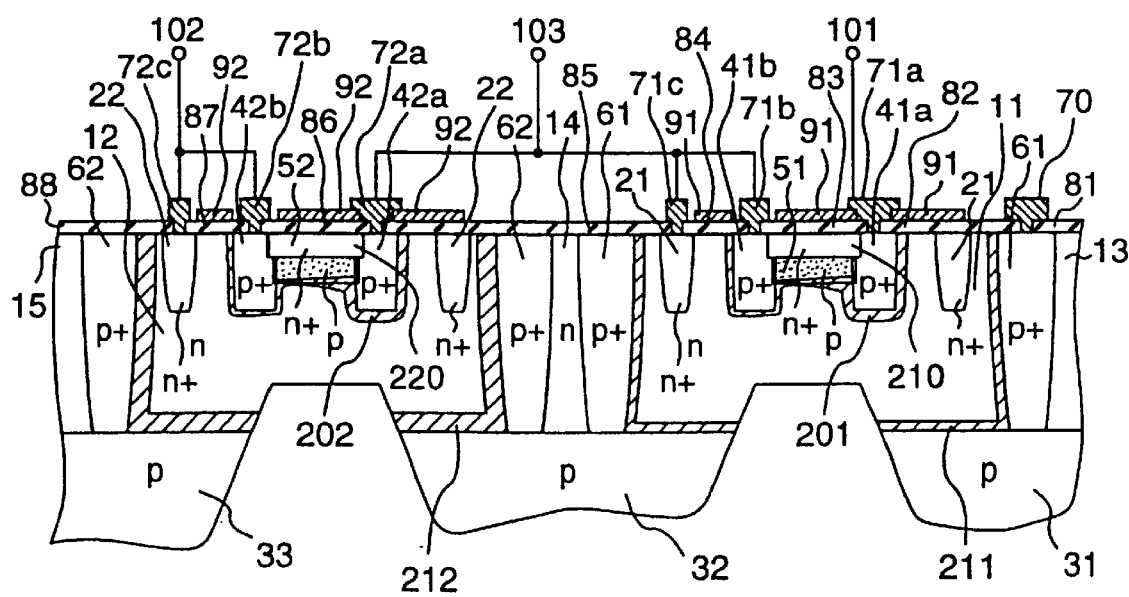
FIG. 25 is a diagram illustrating the operation of a sixth embodiment of the present invention.

FIG. 25 is a diagram illustrating the operation of a sixth embodiment of the present invention. In FIG. 25, components having the same characters as those of FIG. 4 will not be described. In FIG. 4 illustrating the operation of the first embodiment according to the present invention, insulating films 83 and 86 are formed respectively on the piezoresistive elements 51 and 52. However, the embodiment shown in FIG. 25 has a feature that n+-type semiconductor regions 210 and 220 each having a high impurity concentration are newly provided on the piezoresistive elements. A resistive element for sensing the differential pressure is located directly under the n+-type semiconductor regions 210 and 220 each having a high impurity concentration. Therefore, variation can be suppressed by the external atmosphere and the potential of the electric conductors 91 and 92 for shielding. In addition, spreads of depletion layers within all semiconductors forming the bridge circuit can be made to have the same shape as described in detail in FIG. 4. A semiconductor composite sensor having high accuracy and high reliability can thus be obtained.

Figure 26:
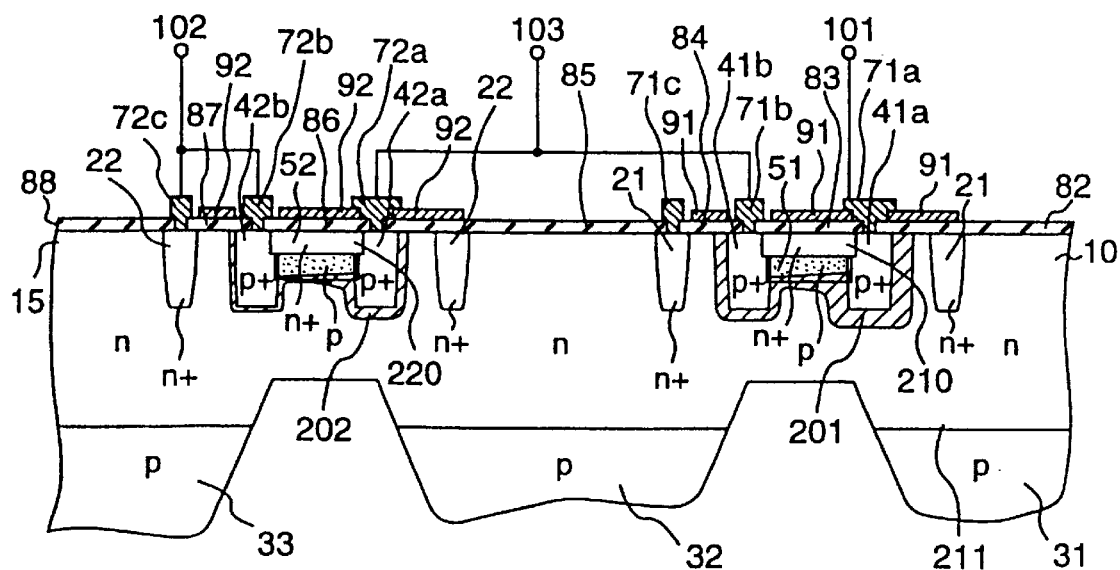
FIG. 26 is a diagram illustrating the operation in the case where the first or second embodiment has not been applied to FIG. 25.

FIG. 26 is a diagram illustrating the operation of FIG. 25 referred to in description of the the sixth embodiment of the present invention in the case where the p+-type semiconductor regions 61 and 62, each having a high impurity concentration, are removed, and it is a schematic sectional view in the case where a voltage of 3 V is applied across piezoresistive elements connected in series by applying ground potential to the electrode terminal 101 and applying a voltage of 3 V to the electrode terminal 102. Detailed description of the operation is identical to that of FIG. 8. Only the principal point will now be described. Since the n+-type semiconductor region 22 is at a potential of 3 V, the n-type semiconductor region 10 is also at the potential of 3 V. The p+-type semiconductor region 41a is at ground potential, and the p+-type semiconductor region 42a is at a potential of 1.5 V. Therefore, the depletion layer 201 becomes wider than the depletion layer 202. The depletion layer spreading in the p-type semiconductor region 51 becomes wider than the depletion layer spreading in the p-type semiconductor region 52. Even if piezoresistive elements having the same diffusion shape and impurity concentration dustribution are formed, therefore, the piezoresistive element 51 becomes higher in resistance value than the piezoresistive element 52. Due to such an imbalance caused in resistance of the bridge circuit, it is difficult to improve the accuracy.

Figure 27:
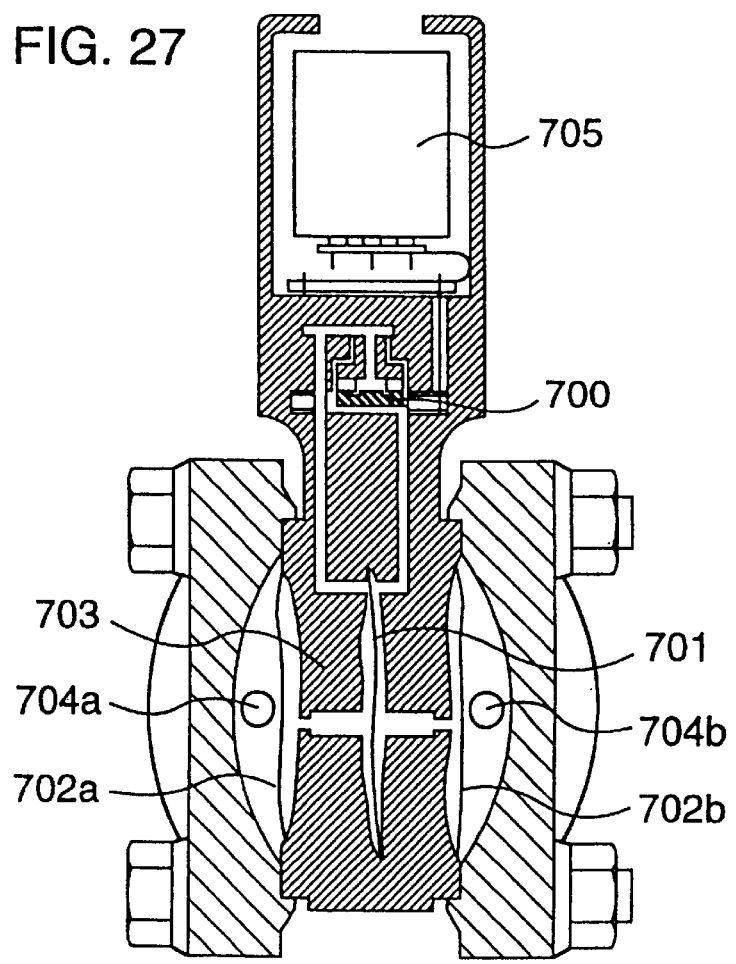
FIG. 27 shows a differential pressure transmitter having a semiconductor composite sensor of the present invention.
Figure 22:
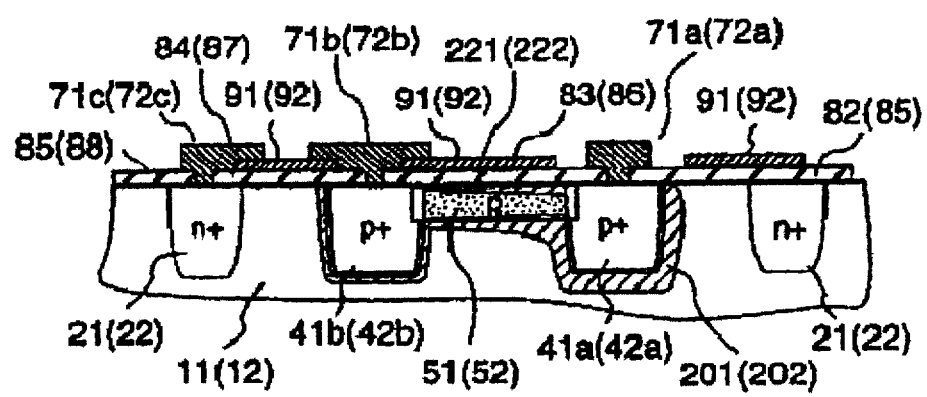
Figure 23:
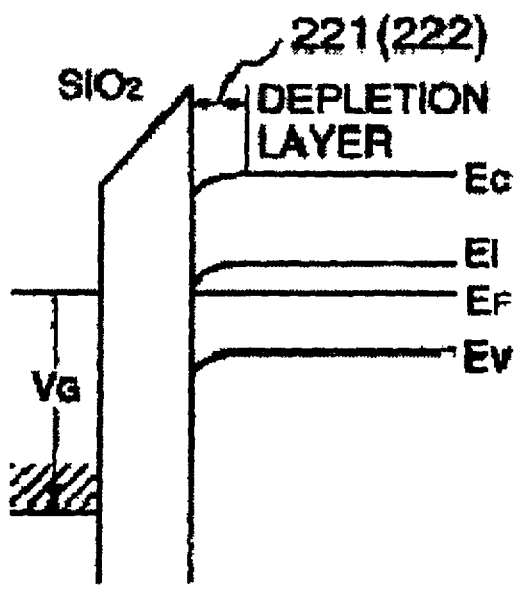
Figure 25:
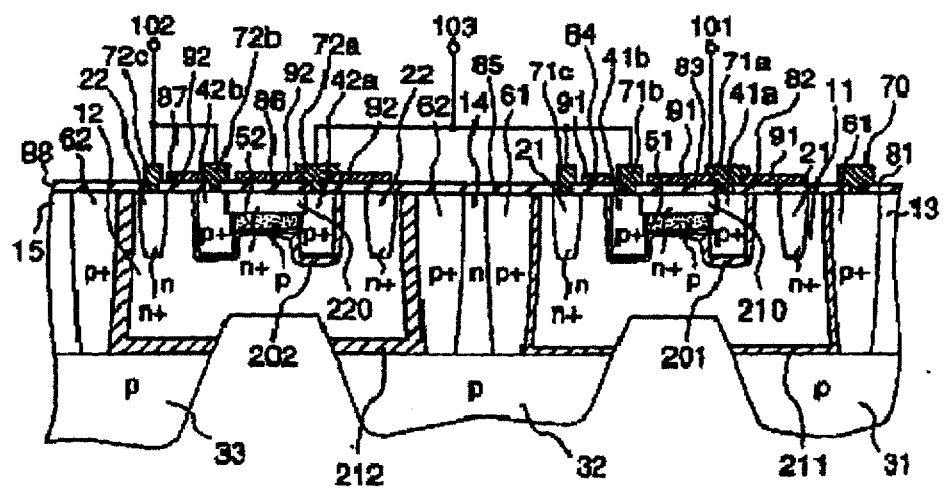
Figure 26:
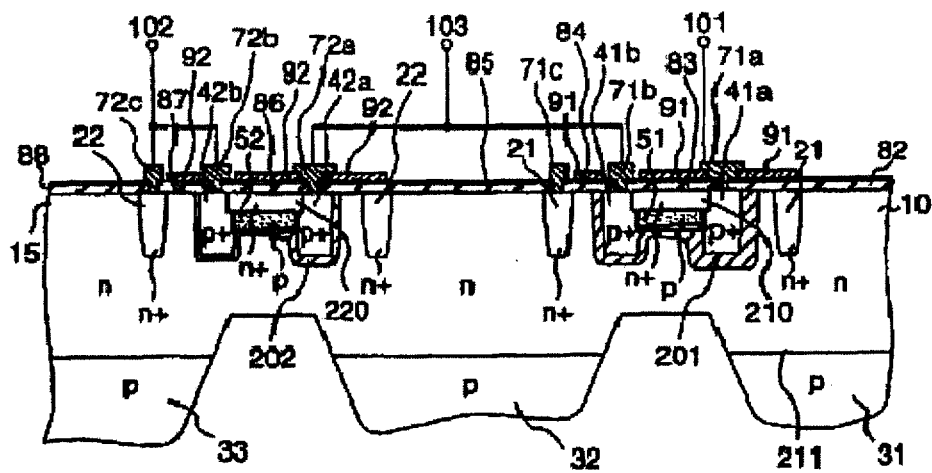

FIG. 27 shows an example of a differential pressure transmitter having a semiconductor composite sensor of the present invention. In FIG. 27, numeral 700 denotes a composite sensor substrate having integration of a differential pressure sensor of the present invention, and a static pressure sensor and a temperature sensor to which the present invention has been applied. Numeral 701 denotes a sensor diaphragm for separating a high pressure side from a low pressure side, and 702a and 702b denote seal diaphragms for separating external environment from a pressure transmission medium (such as silicon oil) contained within the transmitter and receiving the external pressure. Numeral 703 denotes a composite transmitter main body including SUS, and 704a and 704b denote pressure inlet ports. Numeral 705 denotes a signal processing circuit for amplifying outputs of the sensors and conductng correction calculations. By using a semiconductor composite sensor of the present invention in this intelligent composite transmitter, accurate static pressure values can be detected without being affected by the differential pressure. The output of the differential pressure sensor is also affected by a great static pressure as high as 100 atmosphere or more. Since an accurate static pressure value can be known, however, correction with a high accuracy can be realized. The accuracy of differential pressure detection can be improved.

In applying at least two piezoresistive elements to connection in a semiconductor composite sensor including a composite of a differential pressure sensor using piezoresistive gauge elements, a static pressure sensor and a temperature sensor, the present invention makes it possible to form the same accumulation layers or depletion layers on piezoresistive elements. Therefore, electric influence exerted upon piezoresistive elements can be avoided. The accumulation layers and depletion layers formed at that time are capable of having the same shape in both piezoresistive elements. Changes of resistance values caused by the accumulation layers or depletion layers can be made constant. Furthermore, since the depletion layers in both piezoresistive elements can be provided with the same shape, changes of resistance values caused by depletion layers can be made constant.

Especially when a bridge circuit is to be formed with piezoresistive elements, the present invention makes it possible to align resistance values of piezoresistive elements with high accuracy. And it is possible under any situation and environment of use. Therefore, it is not necessary to consider means of output correction or the like. It thus becomes possible to provide a highly accurate, highly reliable semiconductor composite sensor by the contrivance alone of the sensor configuration.

What is claimed is:

1. A semiconductor composite sensor comprising:
   at least two detection regions, each detection region including:
      a sensor substrate having a first p-type semiconductor region and a first n-type semiconductor region formed on said first p-type semiconductor region;
      a piezo-resistive element having a second p-type semiconductor region formed in a part of said first n-type semiconductor region and having a resistance value which changes in accordance with a pressure applied thereto;
      an isolating means surrounding said piezo-resistive element formed to extend through said first n-type semiconductor region and communicate with said first p-type semiconductor region;
   the piezo-resistive elements in said detection regions being serially interconnected; and
   each piezo-resistive element having a first electrode adapted for connection to a higher potential and a second electrode adapted for connection to a lower potential, said first electrode also contacting said first n-type semiconductor region in its associated detection region.

2. The sensor according to claim 1, wherein said isolating means comprises a third p-type semiconductor region.

3. The sensor according to claim 1, wherein four of said detection regions are provided and piezo-resistive elements in said four detection regions are connected to form a bridge circuit.

4. The sensor according to claim 1, wherein said isolating means comprises an insulator.

5. The sensor according to claim 1 further comprising, for each piezo-resistive element formed on said first n-type semiconductor region, a shielding layer including a second n-type semiconductor region formed in a main surface of the first n-type semiconductor region opposite to another main surface thereof contacting with said first p-type semiconductor region, overlying the piezo-resistive element, said second n-type semiconductor region having a larger area and a higher impurity concentration than the piezo-resistive element.

6. A differential pressure transmitter comprising:
   a lower side pressure inlet port and a higher side pressure inlet port to which respectively lower and higher pressures are introduced;
   a composite sensor substrate including sensors to detect physical quantities including a differential pressure, a static pressure and a temperature; and
   a sealing diaphragm and a pressure transmission medium through which respectively introduced lower side and higher side pressures are transmitted to said composite sensor substrate,
   said composite sensor substrate comprising:
      at least two detection regions, each detection region including:
         a sensor substrate having a first p-type semiconductor region and a first n-type semiconductor region formed on said first p-type semiconductor region;
         a piezo-resistive element having a second p-type semiconductor region formed in a part of said first n-type semiconductor region and having a resistance value which changes in accordance with a pressure applied thereto;
         an isolating means surrounding said piezo-resistive element formed to extend through said first n-type semiconductor region and communicate with said first p-type semiconductor region;
   the piezo-resistive elements in said detection regions being serially interconnected; and
   each piezo-resistive element having a first electrode adapted for connection to a higher potential and a second electrode adapted for connection to a lower potential, said first electrode also contacting said first n-type semiconductor region in its associated detection region.

* * * * *

UNITED STATES PATENT AND TRADEMARK OFFICE
CERTIFICATE OF CORRECTION

PATENT NO. : 6,211,772 B1
DATED : April 3, 2001
INVENTOR(S) : Susumu Muakami et al.

It is certified that error appears in the above-identified patent and that said Letters Patent is hereby corrected as shown below:

Drawings,
Figs. 22, 23, 25 and 26 should be replaced with the following attached sheets.

Column 2,
Line 21, change "interferring" to -- interfering --.
Line 39, change "uisng" to -- using --.

Column 7,
Line 42, change "jucntion" to -- junction --.

Signed and Sealed this

Seventh Day of May, 2002

JAMES E. ROGAN
*Director of the United States Patent and Trademark Office*

*Attest:*

*Attesting Officer*